(12) United States Patent
Akita et al.

(10) Patent No.: US 9,088,721 B2
(45) Date of Patent: *Jul. 21, 2015

(54) IMAGING APPARATUS AND DISPLAY CONTROL METHOD THEREOF

(71) Applicant: Sony Corporation, Tokyo (JP)

(72) Inventors: Miho Akita, Tokyo (JP); Kazuyuki Marukawa, Kanagawa (JP); Sho Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/947,729

(22) Filed: Jul. 22, 2013

(65) Prior Publication Data

US 2014/0028888 A1 Jan. 30, 2014

Related U.S. Application Data

(63) Continuation of application No. 12/589,213, filed on Oct. 20, 2009, now Pat. No. 8,520,120.

(30) Foreign Application Priority Data

Nov. 5, 2008 (JP) ................................ P2008-284293

(51) Int. Cl.
*H04N 5/232* (2006.01)
*G03B 13/04* (2006.01)
(Continued)

(52) U.S. Cl.
CPC ............ *H04N 5/23293* (2013.01); *G03B 13/04* (2013.01); *G03B 13/12* (2013.01); *G03B 17/02* (2013.01); *G03B 19/02* (2013.01); *H04N 5/23241* (2013.01); *H04N 5/23245* (2013.01)

(58) Field of Classification Search
CPC ............ H04N 5/23293; H04N 5/2228; H04N 1/00411; G03B 13/00; G03B 13/02; G03B 13/04; G03B 13/10; G03B 13/16; G03B 2213/02

USPC ................ 348/333.01–333.13, 371, 373–376
See application file for complete search history.

(56) References Cited

U.S. PATENT DOCUMENTS 7,173,665 B2   2/2007   Kawasaki et al.
8,223,241 B2 *  7/2012   Gayer ...................... 348/333.01
(Continued)

FOREIGN PATENT DOCUMENTS

JP   2003324632 A   11/2003
JP   2005221907 A    8/2005
(Continued)

OTHER PUBLICATIONS

European Search Report, EP 09175146, dated Jan. 29, 2010.
(Continued)

*Primary Examiner* — Aung S Moe
(74) *Attorney, Agent, or Firm* — Sony Corporation

(57) ABSTRACT

An imaging apparatus includes: a first display panel unit configured to execute display toward a user side, disposed on an apparatus casing; a second display panel unit configured to execute display toward a subject side, disposed on the apparatus casing; an imaging processing unit configured to subject incident light from the subject side to photoelectric conversion to obtain a captured image signal; and a control unit configured to execute imaging processing control according to the imaging mode setting, and execute display based on the captured image signal obtained by the imaging processing unit with the first display panel unit, while controlling the display operations based on the captured image signal obtained with the imaging processing unit of the second display panel unit, at least according to the imaging mode.

13 Claims, 15 Drawing Sheets

(51) Int. Cl.
  *G03B 13/12* (2006.01)
  *G03B 17/02* (2006.01)
  *G03B 19/02* (2006.01)

(56) References Cited

U.S. PATENT DOCUMENTS

| | | |
|---|---|---|
| 8,325,264 B2 | 12/2012 | Akita et al. |
| 8,520,120 B2 * | 8/2013 | Akita et al. ............... 348/333.13 |
| 2005/0062876 A1 * | 3/2005 | Okutani et al. ............... 348/371 |
| 2005/0099533 A1 | 5/2005 | Matsuda et al. |
| 2005/0153679 A1 | 7/2005 | Kim |
| 2005/0270369 A1 | 12/2005 | Nonaka |
| 2006/0078324 A1 * | 4/2006 | Yasuda et al. ................. 396/299 |
| 2006/0210263 A1 | 9/2006 | Oh |
| 2007/0115382 A1 | 5/2007 | Fukuma et al. |
| 2007/0248330 A1 | 10/2007 | Pillman et al. |
| 2007/0279511 A1 * | 12/2007 | Misawa ................... 348/333.06 |
| 2011/0032377 A1 | 2/2011 | Kim et al. |
| 2011/0102621 A1 * | 5/2011 | Kim ........................... 348/222.1 |
| 2013/0044993 A1 | 2/2013 | Akita et al. |

FOREIGN PATENT DOCUMENTS

| | | |
|---|---|---|
| JP | 2007-158799 A | 6/2007 |
| JP | 2008-228053 A | 9/2008 |

OTHER PUBLICATIONS

Office Action from Japanese Application No. 2008-284293, dated Oct. 19, 2010.

* cited by examiner

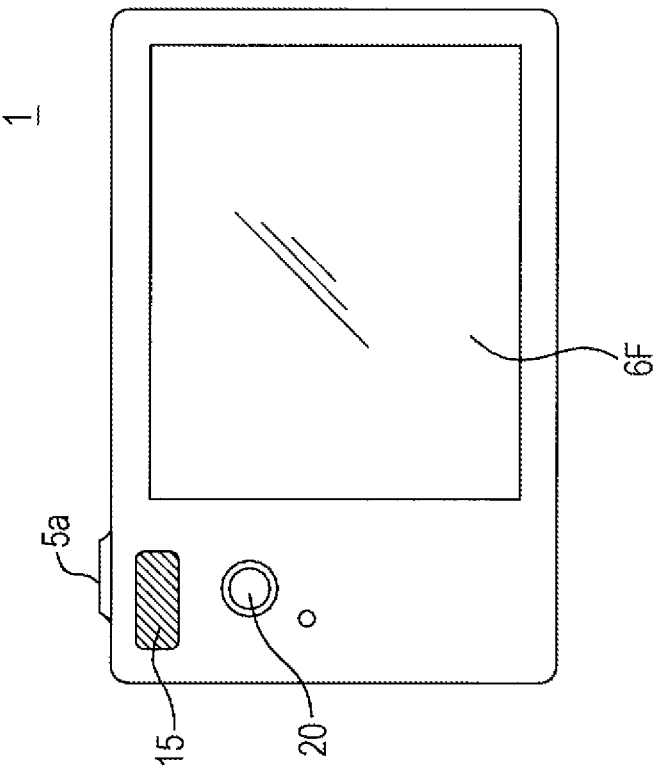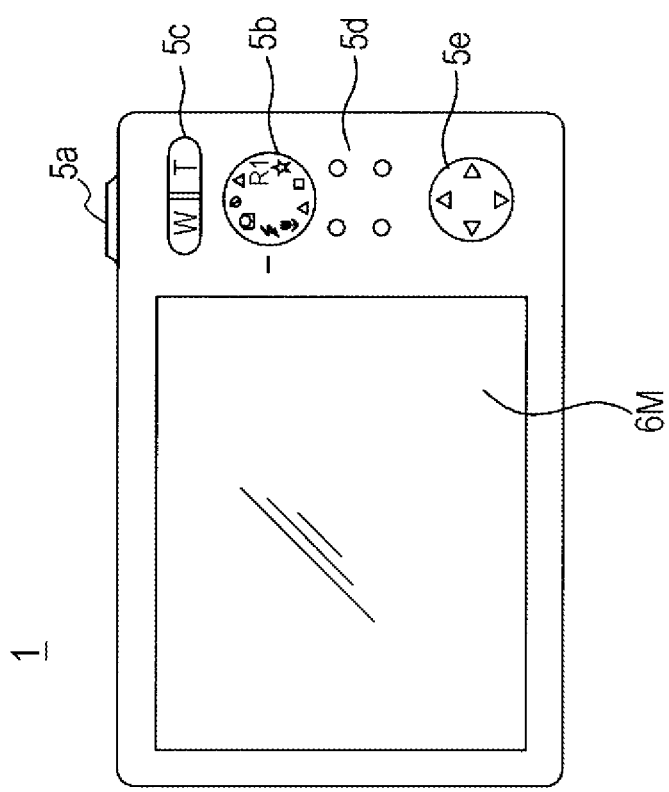

IMAGING APPARATUS AND DISPLAY CONTROL METHOD THEREOF

CROSS-REFERENCE TO RELATED APPLICATION

The present application is a continuation of U.S. patent application Ser. No. 12/589,213, filed Oct. 20, 2009, which claims priority from Japanese Patent Application No. JP 2008-284293 filed in the Japanese Patent Office on Nov. 5, 2008, the entire contents of which are incorporated herein by reference.

BACKGROUND OF THE INVENTION

1. Field of the Invention

The present invention relates to an imaging apparatus and the display control method thereof, and specifically relates to the display operation of an imaging apparatus wherein multiple display panel units are provided on the casing thereof.

2. Description of the Related Art

Imaging apparatuses such as digital still cameras, digital video cameras, and so forth have come into widespread use, and with many of them, a display panel made up of a liquid crystal panel or the like is formed.

For example, as disclosed in Japanese Unexamined Patent Application Publication No. 2007-158799, an arrangement is made wherein a display panel is provided on a camera casing with a relatively great area, monitoring of a subject image is executed at the time of imaging, and playback display is executed at the time of playback of a captured image.

SUMMARY OF THE INVENTION

Now, the present assignee has newly conceived an arrangement for providing two display panel units on the casing of an imaging apparatus. Specifically, similar to the related art, in addition to a display panel unit configured to execute display toward the user (the person using the imaging apparatus) direction on an imaging apparatus casing, a display panel unit configured to execute display toward a subject side is provided to the front face side (side serving as a subject side) or the like on the apparatus casing.

Thus, in the case that such two display panel units are provided, suitable display should be made at each display panel, i.e., display effective for a viewer, and display operation so as to avoid wasteful operations and consumption power, according to the operation state or situation relating to imaging.

It has been found to be desirable to realize suitable display at an imaging apparatus including two display panel units.

According to an embodiment of the present invention, an imaging apparatus includes: a first display panel unit configured to execute display toward a user side, disposed on an apparatus casing; a second display panel unit configured to execute display toward a subject side, disposed on the apparatus casing; an imaging processing unit configured to subject incident light from the subject side to photoelectric conversion to obtain a captured image signal; and a control unit configured to execute imaging processing control according to the imaging mode setting, and execute display based on the captured image signal obtained by the imaging processing unit with the first display panel unit, while controlling the display operations based on the captured image signal obtained with the imaging processing unit of the second display panel unit, at least according to the imaging mode.

Also, the control unit may perform control to execute display based on the captured image signal obtained with the imaging processing unit on the second display panel, in the case that the imaging mode is a predetermined imaging mode determined beforehand out of multiple imaging modes.

Also, the control unit may perform control to turn the display of the second display panel off in the case that the imaging mode is not the predetermined imaging mode.

Also, the control unit may perform control to execute display based on the captured image signal obtained with the imaging processing unit on the second display panel unit in a low luminance state, in the case that the imaging mode is not the predetermined imaging mode.

Also, the imaging apparatus may further include: an image data reading unit configured to read image data recorded on a storage medium; wherein the control unit performs control to execute display based on image data read out by the image data reading unit on the second display panel, in the case that the imaging mode is not the predetermined imaging mode.

Also, the control unit may control the display operation based on the captured image signal obtained with the imaging processing unit on the second display panel unit, based on the imaging mode and a settings state according to the operations of the user relating to operations of the imaging apparatus other than the imaging mode.

Also, the control unit may control the display operation based on the captured image signal obtained with the imaging processing unit on the second display panel unit, based on the imaging mode and the internal detecting information of the imaging apparatus.

Also, the imaging apparatus may further include: an image analysis unit configured to perform image analysis of the captured image signal obtained with the imaging processing unit, wherein the control unit controls the display operation based on the captured image signal obtained with the imaging processing unit with the second display panel unit, based on the imaging mode, and image analysis information from the image analysis unit.

Also, the image analysis unit may detect whether or not a person exists at the subject side from the image analysis of the captured image signal obtained with the imaging processing unit.

Also, the imaging apparatus may further include: an operating unit configured to select the imaging mode.

A display control method for the imaging apparatus with a first display panel unit configured to execute display toward a user side and a second display panel unit configured to execute display toward a subject side includes the steps of: executing display on the first display panel based on a captured image signal obtained by subjecting incident light from the subject side to photoelectric conversion; and with a second display panel unit configured to execute display toward a subject side, disposed on the apparatus casing; and controlling display operations of said captured image signal on the second display panel according to an imaging mode selected from various types of imaging modes to perform imaging processing suitable to the imaging situation.

That is to say, according to the above configuration, operations for the second display panel unit are performed according to imaging mode. An imaging mode is a mode set according to various types of imaging situations and imaging objectives. For example, these are modes that a user can select, for example, so that imaging processing suitable can be performed according to what sort of image is desired in what sort of location and situation, for example. Exposure adjusting conditions, signal processing parameters, and so forth are set for each of various types of imaging modes.

In the case of the above configuration, the possibility of a person existing at the subject side is determined, and display with the second display panel unit is performed.

Also, for example, during the monitoring period at the time of imaging of a still image (when awaiting a suitable timing for imaging of a still image), the user of the imaging apparatus (i.e., a user who attempts to perform imaging of a still image with the imaging apparatus) performs monitoring of a subject image using the first display panel unit. This monitoring image is a captured image signal to be obtained at the imaging device unit during that period, also referred to as a through image, a real time moving image of a subject scene. The user confirms the subject image thus imaged to perform a release operation (shutter operation) at a desired timing. This is the same as with a common imaging apparatus.

During this monitoring period, with the second display panel unit, it is suitable to execute display based on a captured image signal, i.e., display a monitoring image serving as a through image. For example, in the case that a subject is a person, the person thereof can confirm his facial expression, pose, or the like to be imaged through the display of the second display panel unit.

However, this is effective only when the person is on the subject side. For example, when the user selects a scenery mode serving as an imaging mode, and attempts to image scenery where there is no person, it can be conceived that there is no person who view the display of the second display panel unit. Therefore, in such a case, there is no meaning even if a monitoring image is displayed on the second display panel unit. Consequently, it is suitable to attempt to perform power saving by turning off the second display panel unit.

For example, the display operations of the second display panel units are controlled suitably according to the status estimated from the imaging mode at that time, whereby useful display or more enjoyable display by the two display panel units, avoidance of increase in excessive consumption power even if the two display panel units are provided, or the like can be realized.

According to the above configuration, with an imaging apparatus, two display panel units are provided whereby the user side and the subject side can visually recognize their sides respectively, and each display panel can execute suitable display according to the imaging status estimated by the imaging mode.

Particularly, whether or not there is a person at the subject side who can view the second display panel and the display thereupon unit is assumed, and the display operation of the second display panel unit is controlled accordingly. That is to say, useful display, display with high enjoyableness, avoidance of wasteful display, or the like can be realized, and accordingly, a new and useful imaging apparatus can be provided.

BRIEF DESCRIPTION OF THE DRAWINGS

FIGS. 1A and 1B are explanatory diagrams of an external view example of an imaging apparatus according to an embodiment of the present invention;

DESCRIPTION OF THE PREFERRED EMBODIMENTS

Figure 2:
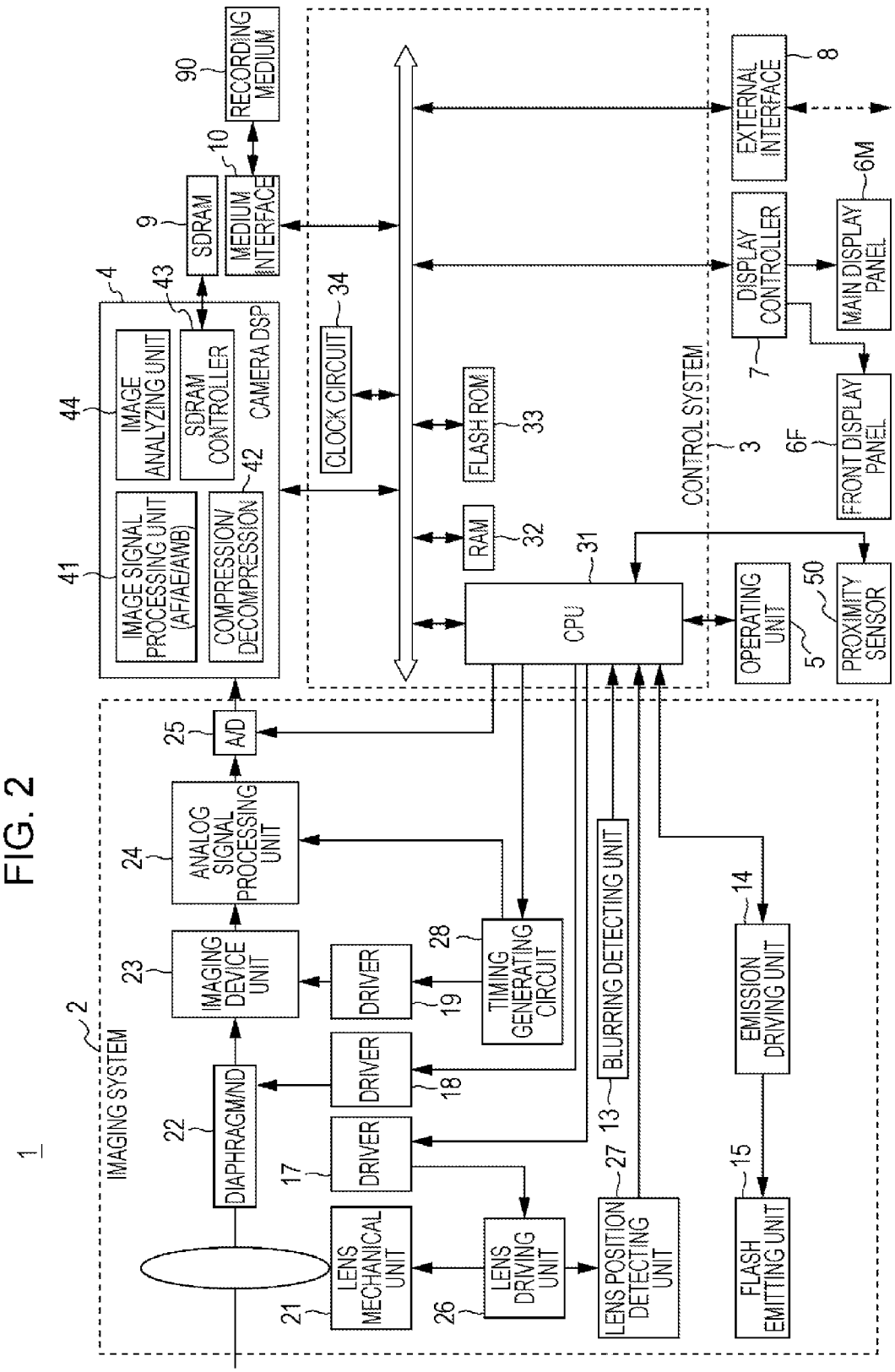
FIG. 2 is a block diagram of the imaging apparatus according to the embodiment.

Description will be made below regarding an embodiment of the present invention in accordance with the following sequence.

1. Configuration of Imaging Apparatus
2. Operation Transition
3. Screen Display Examples of Both Display Panel Units
4. Display Control of Front Display Panel Unit When Monitoring
 <4-1: Processing Example Based on Imaging mode>
 <4-2: Processing Example Based on Imaging mode and User Settings>
 <4-3: Processing Example Based on Imaging mode and Internal Detecting Information>
 <4-4: Processing Example Based on Imaging mode and Image Analysis Information>
5. Display Control of Front Display Panel Unit During Playback
6. Modification Examples 1. Configuration of Imaging Apparatus As an embodiment of the present invention, the configuration of an imaging apparatus, for example, serving as a digital camera, will be described with reference to FIGS. 1A, 1B, and 2.

FIGS. 1A and 1B illustrate an external view of an imaging apparatus 1 according to the present example as viewed from the back side (user side) and front side (subject side) thereof. With the imaging apparatus 1, an imaging lens unit 20 and a flash emitting unit 15, and so forth are provided to the front side.

Also, operators used for user operations are formed on various portions such as the casing upper face, back side, and so forth. For example, there are provided a release operation key 5a, a dial operating portion 5b, a wide/tele operation key 5c, various types of operating keys 5d, a D-pad 5e, and so forth. The dial operating portion 5b is used for selection of an imaging mode or the like, for example. Operations such as a menu instruction, a playback instruction, an exposure correction instruction, and so forth are available through the operating keys 5d. The D-pad 5e is used for various types of operations including selection/determination of an operation menu item to be displayed on a display panel 6, for example.

With the imaging apparatus 1, as shown in FIG. 1A, a main display panel 6M made up of a liquid crystal panel, an organic electroluminescence (EL) panel, or the like is provided to the back side, and as shown in FIG. 1B, a front display panel 6F similarly made up of a liquid crystal panel, an organic EL panel, or the like is provided to the front side.

The main display panel 6M and the front display panel 6F have, for example, the same screen size, and are provided so as to occupy a relatively wide area of the casing back and the casing front respectively. With the main display panel 6M, basically, during the monitoring period (when awaiting a suitable timing in the imaging mode) display of a monitoring image (through image) where a user is a subject is executed, whereby the user can confirm a subject scenery serving as an imaging target. Also, with a playback mode, display of a playback image or thumbnail images is executed in accordance with the operation by the user.

On the other hand, the front display panel 6F is directed to the subject side to execute display. With the front display panel 6F as well, an arrangement is made wherein display of a monitoring image or the like is executed, whereby a person serving as the subject side can view display content thereof, which will be described later.

A configuration example of such an imaging apparatus 1 will be described with reference to FIG. 2. As shown in FIG. 2, the imaging apparatus 1 includes an imaging system 2, a control system 3, a camera digital signal processor (DSP) 4, an operating unit 5, a main display panel 6M, a front display panel 6F, a display controller 7, an external interface 8, SDRAM (Synchronous Dynamic Random Access Memory) 9, and a medium interface 10.

The imaging system 2 is a portion to execute an imaging operation, and includes a lens mechanical unit 21, a diaphragm/ND filter mechanism 22, an imaging device unit 23, an analog signal processing unit 24, an A/D conversion unit 25, a lens driving unit 26, a lens position detecting unit 27, a timing generating circuit 28, a blurring detecting unit 13, an emission driving unit 14, a flash emitting unit 15, a lens driving driver 17, a diaphragm/ND driving driver 18, and an imaging device driver 19.

The incident light from a subject is guided to the imaging device unit 23 via the lens mechanical unit 21 and the diaphragm/ND filter mechanism 22. The lens mechanical unit 21 is the internal configuration of the imaging lens unit 20 in FIG. 1B, and includes multiple optical lens groups such as a cover lens, a focus lens, a zoom lens, and so forth. Also, the lens driving unit 26 is a transfer mechanism to transfer the focus lens or zoom lens in the optical axis direction. The lens driving unit 26 to which driving power is applied by the lens driving driver 17 transfers the focus lens or zoom lens. A later-described CPU (Central Processing Unit) 31 controls the lens driving driver 17, thereby executing focus control or zoom operation.

The diaphragm/ND filter mechanism 22 includes a diaphragm mechanism, and an ND filter mechanism to attenuate an incident light quantity by being inserted into the lens optical system, and executes optical quantity adjustment. The diaphragm/ND filter mechanism 22 executes optical quantity adjustment by opening/closing a diaphragm mechanism. Also, the diaphragm/ND driving driver 18 takes an ND filter in and out as to the optical axis of incident light, thereby adjusting an incident light quantity. The CPU 31 controls the diaphragm/ND driving driver 18 to drive the diaphragm mechanism or ND filter, whereby incident light quantity control (exposure adjustment control) can be executed.

The luminous flux from the subject passes through the lens mechanical unit 21 and the diaphragm/ND filter mechanism 22, whereby a subject image is formed on the imaging device unit 23. The imaging device unit 23 subjects the formed subject image to photoelectric conversion to output the captured image signal corresponding to the subject image. The imaging device unit 23 includes a rectangular imaging region made up of multiple pixels, and sequentially outputs, to the analog signal processing unit 24, the image signal that is the analog signal corresponding to the charge accumulated in each pixel in increments of pixels. For example, a CCD (Charge Coupled Device) sensor array, a CMOS (Complementary Metal Oxide Semiconductor) sensor array, or the like is used as the imaging device unit 23.

The analog signal processing unit 24 internally includes a CDS (Correlation Double Sampling) circuit, an AGC (Automatic Gain Control) circuit, and so forth, and subjects the image signal input from the imaging device unit 23 to a predetermined analog process. The A/D conversion unit 25 converts the analog signal processed as the analog signal processing unit 24 into a digital signal, and supplies this to the camera DSP 4.

The timing generating circuit 28, which is controlled by the CPU 31, controls the timing of various operations of the imaging device unit 23, analog signal processing unit 24, and A/D conversion unit 25.

Specifically, the timing generating circuit 28 supplies, in order to control the imaging operation timing of the imaging device unit 23, a timing signal for exposure/charge readout, a timing signal serving as an electric shutter function, a transfer clock, a synchronizing signal according to a frame rate, and so forth to the imaging device unit 23 via the imaging device driver 19. Also, the timing generating circuit 28 also supplies the above various timing signals to the analog signal processing unit 24 so that the analog signal processing unit 24 can execute a process in sync with transfer of an image signal at the imaging device unit 23.

The CPU 31 executes control of each timing signal generated by the timing generating circuit 28, whereby change of the frame rate of a captured image, and electric shutter control (exposure time variable control within a frame) can be executed. Also, the CPU 31 provides a gain control signal to the analog signal processing unit 24 via the timing generating circuit 28, whereby gain variable control of a captured image signal can be executed.

The blurring detecting unit 13 detects a shaking quantity, and the motion amount of the imaging apparatus 1 itself. The blurring detecting unit 13 is configured of, for example, an acceleration sensor, a vibration sensor, or the like, and supplies detection information serving as a blurring quantity to the CPU 31.

The flash emitting unit 15 is driven by the emission driving unit 14 so as to emit flash light. The CPU 31 instructs the emission driving unit 14 to execute flash emission at a predetermined timing such as the user's operation or the like, whereby the flash emitting unit 15 can be emitted.

The camera DSP 4 subjects the captured image signal to be input from the A/D conversion unit 25 of the imaging system 2 to various types of digital signal processes. With the camera DSP 4, processing functions, for example as shown in the drawing, such as the image signal processing unit 41, compression/decompression processing unit 42, SDRAM controller 43, image analyzing unit 44, and so forth are realized with the internal hardware and software.

The image signal processing unit 41 executes a process as to an input captured image signal. For example, the image signal processing unit 41 executes an autofocus (AF) process, an auto exposure (AE) process, or the like as an operation process used for driving control of the imaging system 2 using a captured image signal, and also executes an auto white balance (AWB) process or the like as a process as to a captured image signal itself to be input.

For example, as the autofocus process, the image signal processing unit 41 executes contrast detection as to an input captured image signal, and transmits the detection information to the CPU 31. Various types of control methods have been used as an autofocus control methods, but with a technique referred to as "contrast AF", contrast detection is executed regarding the captured image signal at each point in time while moving the focus lens forcibly, thereby determining the position of the focus lens in the optimal contrast state. That is to say, the CPU 31 executes control to confirm the contrast detection value detected at the image signal processing unit 41 while executing the movement control of the focus lens prior to an imaging operation, and to determine a position in the optimal contrast state as a focus optimal position.

Also, as focus control during imaging a detection method referred to as so-called wobbling AF can be executed. The CPU 31 confirms the contrast detection value detected at the image signal processing unit 41 while moving the position of the focus lens by swaying the focus lens minutely forward and backward all the time during an imaging operation. The optimal position of the focus lens changes depending to the state of a subject, but contrast detection is executed while changing the focus lens minutely forward and backward, whereby change in the format control direction can be determined according to change in the subject. Thus, autofocus can be executed while tracking the state of a subject.

Note that, with a transfer mechanism of the lens driving unit 26, an address is assigned thereto for each of transfer positions, and a lens position is distinguished with the transfer position address thereof.

The lens position detecting unit 27 distinguishes the address of the focus lens serving as the current lens position of the focus lens, thereby calculating distance to a subject in a focused state, and accordingly, this can be supplied to the CPU 31 as distance information. Thus, the CPU can distinguish distance to a principal subject in a focused state.

As the auto exposure process executed by the image signal processing unit 41 of the camera DSP 4, for example, calculation of subject luminance is executed. For example, the average luminance of input captured image signals is calculated, and this is supplied to the CPU 31 as subject luminance information, i.e., exposure quantity information. As calculation of average luminance, various types of methods can be conceived, for example, such as calculation of the average value regarding the luminance signal values of all the pixels of the captured image data of one frame, calculation of the average value of luminance signal values wherein weight is provided to the center portion of an image, or the like.

The CPU 31 can execute automatic exposure control based on this exposure quantity information, i.e., can execute exposure adjustment in accordance with electronic shutter control at the diaphragm mechanism, ND filter, or imaging device unit 23, or gain control as to the analog signal processing unit 24.

The image signal processing unit 41 of the camera DSP 4 executes automatic white balance, gamma correction, an edge enhancement process, a shaking correction process, or the like as the signal process of the captured image signal itself in addition to a signal generating process used for autofocus operation or auto exposure operation.

The compression/decompression processing unit 42 of the camera DSP 4 executes a compression process as to the captured image signal, or a decompression process as to the compressed image data. For example, the compression/decompression processing unit 42 executes a compression process/decompression process using a method such as JPEG (Joint Photographic Experts Group), MPEG (Moving Picture Experts Group), or the like.

The SDRAM controller 43 executes writing/readout as to the SDRAM 9. The SDRAM 9 is used for temporary storing of the captured image signal input from the imaging system 2, storing at the process stage at the image processing unit 41 or compression/decompression processing unit 42, ensuring of a work region, storing of information obtained at the information analyzing unit 44, or the like, and the SDRAM controller 43 executes writing/readout of such data as to the SDRAM 9.

The image analyzing unit 44 executes image analysis, for example, regarding the captured image data processed at the image signal processing unit 41, and executes various types of image recognition. In the case of the present example, the image analyzing unit 44 executes a recognition process of a person or face included in a subject image. Also, in the case of recognizing a person's face, the image analyzing unit 44 executes a recognition process for facial orientation, sight direction, or the like in some cases. Further, the image analyzing unit 44 detects various types of information that can be recognized by image analysis, such as the size of relative motion between the imaging apparatus 1 and a subject, or the like in some cases.

The control system 3 includes the CPU 31, RAM 32, flash ROM 33, and clock circuit 34. Each unit of the control system 3, camera DSP 4, and each unit of the imaging system 2, display controller 7, external interface 8, and medium interface 10 can communicate image data and control information mutually via the system bus.

The CPU 31 controls the whole of the imaging apparatus 1. Specifically, the CPU 31 executes various types of operation processes, and exchange of a control signal or the like as to each unit based on the program stored in the internal ROM or the like, and the user's operation by the operating unit 5, thereby causing each unit to execute a predetermined operation. Particularly, the CPU 31 executes display control at the main display panel 6M, and a control process used for display operation of a later-described front display panel 6F, or the like.

The RAM (Random Access Memory) 32 is used for temporary storing of the captured image signal (image data of each frame) processed at the camera DSP 4, and storing of information according to each type of process of the CPU 31.

The flash ROM 33 is used for storing of image data (imaged as a still image or moving image by the user) serving as a captured image, or storing of information requested for being saved in a nonvolatile manner. The flash ROM 33 may store control software programs of the imaging apparatus 1, the setting data of the camera, and so forth.

The clock circuit 34 counts the current date and time information (year, month, day, hour, minute, second).

The operating unit 5 is configured of various types of operators (5a through 5e, etc.) shown in FIGS. 1A and 1B, and a signal generating unit based on the operation thereof. The user's operation information by various types of operators is transmitted from the operating unit 5 to the CPU 31. Note that the operating unit 5 may be configured so as to allow the user to perform touch panel operations in addition to operations by the operators. For example, an arrangement may be made wherein a touch sensor is provided to the main display panel 6M, and operation input is performed by the user's touch operation as to screen display.

The display controller 7 controls the main display panel 6M and the front display panel 6F to execute a predetermined display operation based on the control of the CPU 31.

As a display operation at the main display panel 6M, monitoring display (so-called through image display), playback image display read out from the recording medium 90 or flash ROM, operation menu display, various types of icon display, point-in-time display, or the like is executed. Also, as a display operation at the front display panel 6F, monitoring display, or playback image display is executed.

The medium interface 10 executes readout/writing of data as to the recording medium 90 such as a memory card (card-shaped removable memory) set within the imaging apparatus 1, or the like based on the control of the CPU 31. For example, the medium interface 10 executes an operation to record still image data or moving image data serving as an imaged result in the recording medium 90. Also, the medium interface 10 executes an operation to read out image data from the recording medium 90 at the time of the playback mode.

Note that the portable memory card is exemplified as the recording medium 90 here, but another type of recording medium may be used as long as this medium can be used for recording image data serving as a still image or moving image to be kept as an imaged result. For example, a portable disk medium such as an optical disc or the like may be used, or an HDD (Hard Disk Drive) may be installed to record image data.

The external interface 8 executes transmission/reception of various types of data as to an external apparatus via a predetermined cable in accordance with a signal standard, such as USB (Universal Serial Bus) or the like, for example. It goes without saying that an external interface according to another standard such as IEEE (Institute of Electrical and Electronics Engineers) 1394 or the like may be used regardless of the USB method.

Also, the external interface 8 may be configured by a wireless transmission method such as infrared transmission, short-distance wireless communication, or the like instead of a cable transmission method.

The imaging apparatus 1 can execute data transmission/reception as to various types of equipment such as a personal computer or the like via the external interface 8. For example, captured image data can be transferred to an external apparatus.

Note that a proximity sensor 50 is shown in FIG. 2. Let us say that the proximity sensor 50 is a sensor to detect whether or not there is a person in front of the imaging apparatus 1 (subject side). For example, a pyroelectric sensor or the like can be employed. As described above, in the case that person detection is executed by the image analyzing process of the image analyzing unit 44, the proximity sensor 50 may not be provided, or person detection by image analysis, and detection by the proximity sensor 50 may be used together.

2. Operation Transition

The transition of the operation state of the imaging apparatus 1 of the present example will be described with reference to FIG. 3. The various operation states are operation states viewed particularly from the perspective of the display content of the main display panel 6M.

The operation state of the imaging apparatus 1 is changed to the monitoring period, recording period, preview period, and playback period according to the user's operation or the like. Note that, in reality, there are other operation states such as a period wherein communication with an external apparatus is executed, but description thereof will be omitted for the sake of simplifying explanation.

When the imaging apparatus 1 is, for example, powered on, the monitoring operation is started. Note that, there are cases where the imaging apparatus 1 goes to a playback operation state at the time of power-on, such as a case where the user performs a playback operation from a power-off state, or the like.

The monitoring period is an operation period used for executing imaging by the imaging system 2. In the case that the user commonly uses the imaging apparatus 1 to execute imaging of a still image, first, this monitoring operation is executed.

With this monitoring period, a subject image (through image) is displayed on the main display panel 6M. Specifically, the CPU 31 controls the imaging system 2 and camera DSP 4 to execute an operation for imaging during the monitoring period. Subsequently, the CPU 31 stores the captured image data for each frame supplied from the camera DSP 4, for example, in the RAM 32. Subsequently, the CPU 31 transfers the captured image data for each frame to the display controller 7, and controls the main display panel 6M to execute monitoring display. At this time there is a case where the front display panel 6F is also controlled to execute monitoring display, which will be described later.

During this monitoring period, the user selects a subject, or awaits a suitable timing to take a picture, while viewing the display of the main display panel 6M.

During the monitoring period, upon the user pressing the release operation key 5a, i.e., upon the user performing a shutter operation, the operation state enters the recording period.

The CPU 31 executes a process to store the captured image data of one frame to be imaged at the timing of this release operation as still image data. Specifically, the CPU 31 transfers the captured image data captured at such timing to the medium interface 10 to record this in the recording medium 90.

Note that a recording operation according to a release operation may be executed not as to the recording medium 90 but as to the flash ROM 33. Also, an operation system may be employed wherein recording is usually executed as to the recording medium, but in the case that the recording medium 90 is not mounted, recording is executed as to the flash ROM 33. This recording period is a very short period of time immediately after a release operation as viewed from the user, and is a state wherein nothing is displayed on the main display panel 6M for example.

A certain period of time immediately after a recording operation according to a release operation will be referred to as the preview period. The preview period is a period wherein the image recorded in the immediately previous recording operation is displayed on the main display panel 6M, i.e., a period wherein the user is allowed to confirm the imaged still image immediately after.

For example, a period of two seconds to several seconds is the preview period, and during this period the CPU 31 executes control to display the recorded still image data on the main display panel 6M.

Upon predetermined time serving as the preview period having elapsed, the CPU 31 returns the operation state to the monitoring state, and executes operation control serving as the monitoring period. That is to say, a series of operations as imaging of a still image is executed as the monitoring period, recording period, and preview period.

Note that, with the imaging apparatus 1, imaging of a moving image can be executed, but in the case of a moving image, the recording period continues during a period from the start to the end of imaging of the moving image thereof. Also, in this case, no preview period is provided.

In the case that the user has performed an operation to instruct a playback operation, the imaging apparatus 1 proceeds to a playback operation state (playback period). During the playback period, an operation to play the image recorded in the recording medium 90 or flash ROM 33 by imaging or the like is executed.

The CPU 31 reads out the image recorded in the recording medium 90 or flash ROM 33 in response to the user's operation, and instructs the display controller 7 to display thumbnail images or a playback image on the main display panel 6M. Also, the playback image is displayed on the front display panel 6F in some cases.

3. Screen Display Examples of Both Display Panel Units

Screen display examples to be displayed on the main display panel 6M and the front display panel 6F of the imaging apparatus 1 according to the present example will be described with reference to FIGS. 4A through 5C.

FIGS. 4A through 5A show examples of a screen display performed during the monitoring period.

Figure 4A:
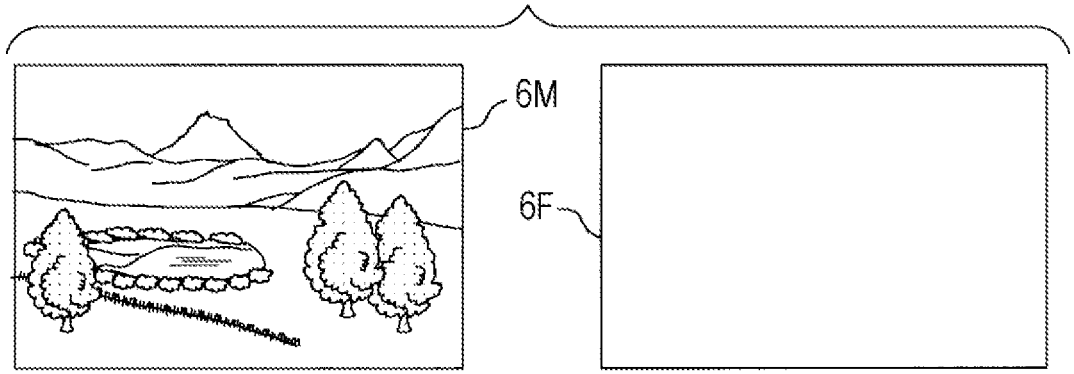
FIGS. 4A through 4C are explanatory diagrams of an image display example of the imaging apparatus according to the embodiment.

FIG. 4A illustrates a state in which monitoring image (through image) is displayed on the main display panel 6M, and display is off on the front display panel 6F.

Figure 4B:
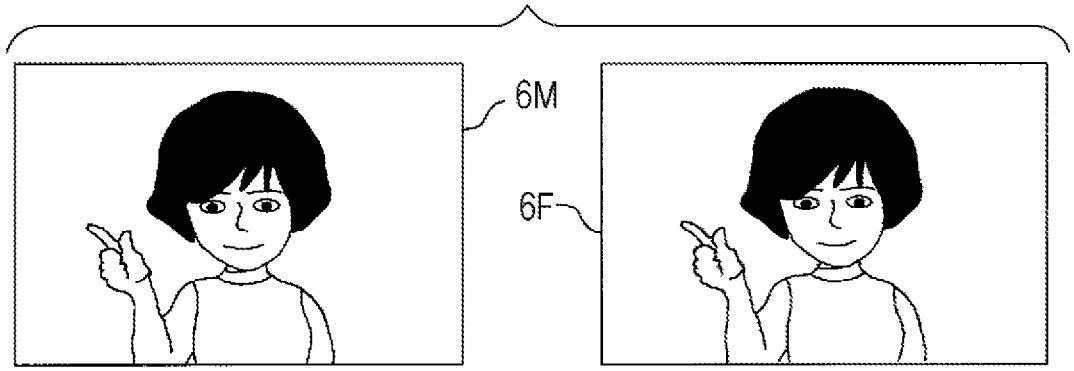

FIG. 4B illustrates a state in which a monitoring image is displayed on the main display panel 6M, and the same monitoring image is also displayed on the front display panel 6F.

Figure 4C:
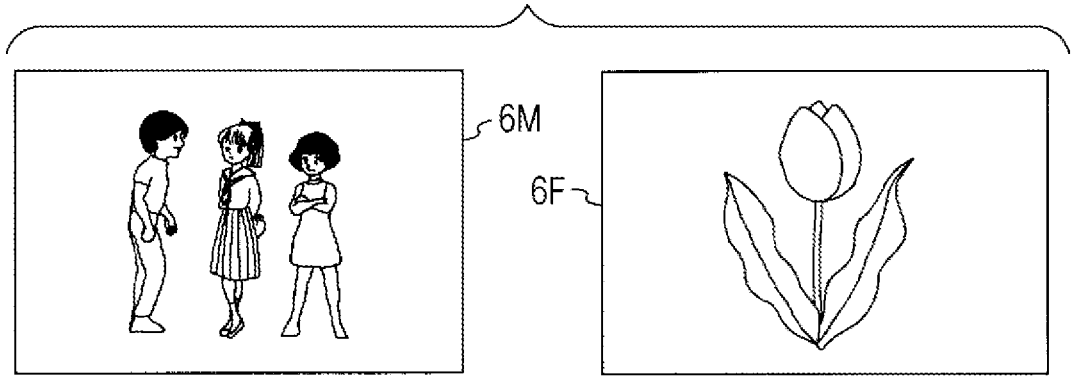

FIG. 4C illustrates a state in which a monitoring image is displayed on the main display panel 6M, and a different monitoring image, a playback image for example, is displayed on the front display panel 6F. The playback image may be a playback image of an image imaged in the past and recorded in the recording medium 90 or flash ROM 33, or may be an image stored in the imaging apparatus 1 beforehand. An example of this case is a case where image data is prepared so as to be displayed when no monitoring image is displayed on the front display panel 6F, and is stored as a preset image in the flash ROM 33 or the like beforehand, and the preset image data thereof is read out and displayed.

Figure 5A:
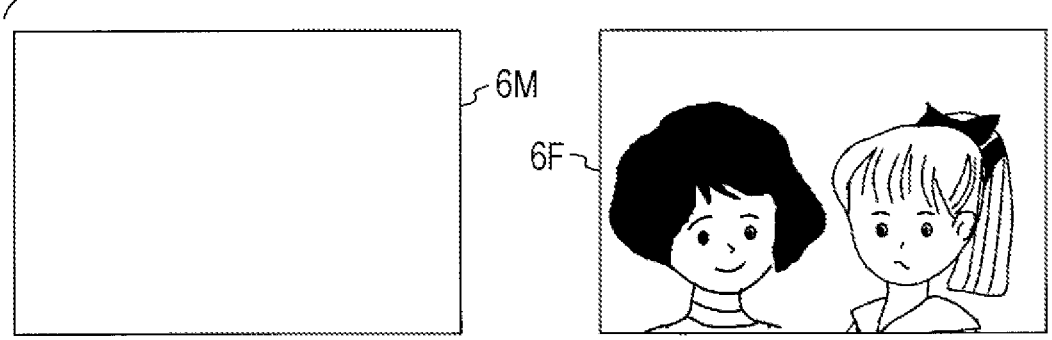
FIGS. 5A through 5C are explanatory diagrams of an image display example of the imaging apparatus according to the embodiment.

Further, the playback image is not restricted to image data serving as a so-called captured image, text data, animation data, computer graphics data, or the like is recorded in the recording medium 90 or flash ROM 33, and such data may be displayed. That is to say, the playback image includes any kind of image that can be displayed. FIG. 5A is an example wherein display is off on the main display panel 6M, and display of a monitoring image is displayed on the front display panel 6F.

These examples may be conceived to be display states of the main display panel 6M and front display panel 6F during the monitoring period, but what sort of display to perform is controlled by the CPU 31 according to the status of the subject, operating status of the imaging apparatus 1, and imaging mode during the monitoring period.

Figure 5B:
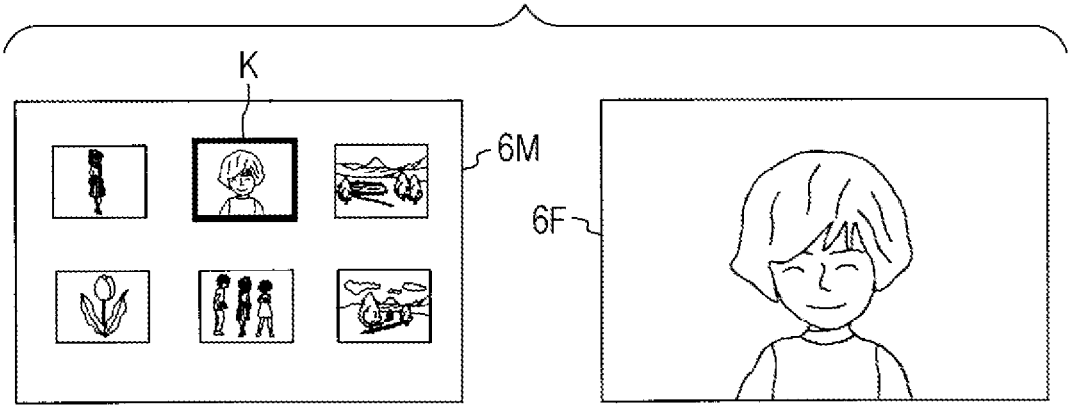
Figure 5C:
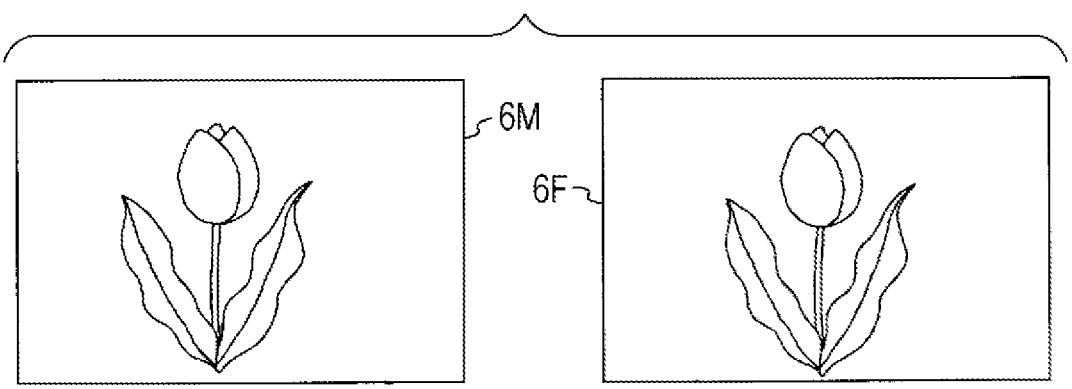

FIGS. 5B and 5C show examples of the screen display performed during the playback period. FIG. 5B illustrates a state in which list display by the thumbnail images of the playback image is executed on the main display panel 6M, and on the other hand, with the front display panel 6F, a playback image under selection by a cursor K within a thumbnail image is displayed. FIG. 5C illustrates a state in which one playback image is displayed on the main display panel 6M, and the same playback image is also displayed on the front display panel 6F.

These examples may be conceived to be display states of the main display panel 6M and front display panel 6F during the playback period. It goes without saying that other examples may also be considered. For example, displaying the playback image on the main display panel 6M and displaying the preset image on the front display panel 6F may be considered. Also, performing a menu display of the thumbnail images on the main display panel 6M while performing sequential display (display as a slide show) of the various playback images on the front display panel 6F may also be considered.

Although a display example is shown in FIGS. 4A through 5C, the display with the main display panel 6M which faces the user that performs imaging operations and playback operations and so forth is basically as follows.

First the monitoring image is displayed in the monitoring period. Also, the image that is imaged and recorded is temporarily displayed in the preview period. The thumbnail image and playback images are displayed in the playback period according to user operations and so forth. The CPU 31 controls the main display panel 6M so as to execute these displays according to operating state and operations.

On the other hand, the CPU 31 performs display control of the front display panel 6F from the perspective of executing useful displays or interesting displays as to the person viewing the front display panel 6F. The various types of display control examples of the front display panel 6F will be described below.

4. Display Control of Front Display Panel Unit at Time of Monitoring

<4-1: Processing Example Based on Imaging Mode>

Figure 6A:
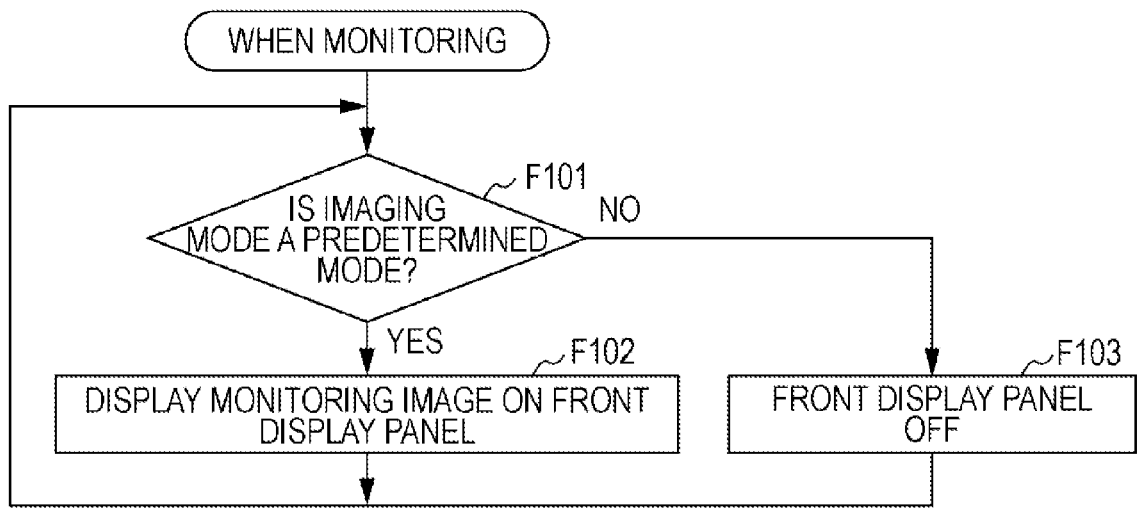
FIGS. 6A and 6B are flowcharts of a display control example of a front display panel based on the imaging mode of the embodiment.

FIG. 6A shows a display control example that the CPU 31 executes regarding the front display panel 6F during the monitoring period. As described above, the monitoring image obtained with the processing in the imaging system 2 and camera DSP 4 is displayed on the main display panel 6M. That is to say, the CPU 31 executes control to display the captured image data supplied from the camera DSP 4 on the main display panel 6M as a through image during the monitoring period.

At this time, in order to perform the display control of the front display panel 6F, the CPU 31 performs processing in FIG. 6A in parallel with the display control of the main display panel 6M.

First in step F101, the CPU 31 confirms the current imaging mode. The imaging mode will be described now.

The imaging mode is a mode that the user selects so as to perform imaging in a suitable state under various situations, such as a night view mode, night view and person mode, portrait mode, scenery mode, "soft snap" mode, snow mode, beach mode, high-speed shutter mode, high-sensitivity mode, smile shutter mode, and so forth.

With each of these imaging modes, suitable shutter speed, suitable exposure setting, suitable signal gain setting as to a captured image signal, suitable signal process settings such as edge enhancement and color process, and so forth have already been determined, and these settings can be selected by the user, for example, according to the operations of the dial operating portion 5*b* shown in FIG. 1A.

The night view mode is an imaging mode wherein imaging is executed with settings suitable for night view imaging. The night view and person mode is an imaging mode wherein imaging is executed with settings capable of imaging the night view of the back and the facial expression of a person with vivid clarity.

The portrait mode is an imaging mode wherein imaging is executed with settings suitable for person imaging.

The scenery mode is an imaging mode wherein imaging is executed with settings suitable for scenery imaging.

The "soft snap" mode is an imaging mode wherein imaging is executed with settings to give a viewer the impression that the texture of the skin of a person is bright and soft.

The high-speed shutter mode is an imaging mode wherein imaging is executed with settings suitable for a moving subject.

The high-sensitivity mode is an imaging mode wherein imaging is executed with natural mood using neither dark scenes nor flash.

The smile shutter mode is an imaging mode wherein upon a subject person becoming a smiling face, a shutter process (release) is automatically executed when the subject person smiles.

Though an imaging mode used for executing an imaging process suitable for such an imaging situation is selected by the user, the CPU 31 executes imaging process control according to the imaging mode settings with the stage of still image imaging from the monitoring period to the recording period. That is to say, the CPU 31 executes various types of parameter instructions as to the imaging system 2 and camera DSP 4 according to the imaging mode selected by the operation of the dial operating portion 5*b*. For example, an instruction is executed, such as the above shutter speed settings, exposure settings, signal process settings, or the like.

Step F101 in FIG. 6A is processing to branch the processing depending on currently which imaging mode is used as such an imaging mode. In the case that, of the above-mentioned various types of imaging modes, the current imaging mode is a predetermined imaging mode suitable to the display of the monitoring image on the front display panel 6F, the CPU advances the processing to step F102, and executes monitoring image display on the front display panel 6F. That is to say, the display controller 7 is instructed to display the monitoring image displayed on the main display panel 6M also on the front display panel 6F. In this case, the display states of the main display panel 6M and the front display panel 6F are states such as shown in FIG. 4B.

On the other hand, in step F101 in the case that the current imaging mode is confirmed to not be a predetermined imaging mode suitable to the display of the monitoring image on the front display panel 6F, the CPU 31 advances the processing to step F103, and controls the display of the front display panel 6F to be turned off. In this case, the display states of the main display panel 6M and the front display panel 6F are states such as shown in FIG. 4A.

The CPU 31 repeatedly executes the processing in FIG. 6A herein during the monitoring period. The monitoring period ending is, for example, in a case of release operation performed and transferring to a recording action, or in a case of playback operations performed and moving to playback action, or a case of the power off operation of the imaging apparatus 1 performed and performing power off processing.

Thus, until the monitoring period is ended, the CPU 31 repeatedly executes the processing in FIG. 6A.

Accordingly during the monitoring period, in the case that the predetermined imaging mode is selected as the imaging mode, the monitoring image is displayed on the front display panel 6F as shown in FIG. 4B, and in the case that the predetermined imaging mode is not selected, the front display panel 6F is turned off as shown in FIG. 4A.

For example, of the various described imaging modes, in step F101 the CPU 31 determines the predetermined imaging mode suitable to the display of the front display panel 6F to be a night scene and person mode, portrait mode, "soft snap" mode, smile shutter mode, and so forth. That is to say, these imaging modes are determined beforehand to be applicable to the predetermined imaging mode in the processing in step F101.

These imaging modes are selected in the case of having the objective of imaging of a person, and accordingly, there is a high possibility that a person is included as a subject. That is to say, there is a high possibility that there is a person who can view the display of the front display panel 6F as a subject.

Therefore, the CPU 31 determines that if the imaging mode is one of the night view and person mode, portrait mode, "soft snap" mode, and smiling shutter mode, in step F102 the monitoring image is displayed on the front display panel 6F.

In the case that the imaging mode is an imaging mode other than those, i.e., the night view mode, scenery mode, high-speed shutter mode, or high-sensitivity mode, the imaging mode is assumed to be selected in the case of having no objective of imaging of a person, or the visibility of the front display panel 6F is assumed to be in a poor state.

For example, the night view mode and the scenery mode are intended for scenery imaging, and a situation can be assumed wherein no person is included in the subject, or even if a person is included, the person thereof has no primary role within the image. Also, in the case of the night view mode or high-sensitivity mode, even if there is a person in front, a monitoring image displayed at the time of imaging a dark scene on the front display panel 6F would result in poor visibility from the person in front thereof.

Also, a subject in the high-speed mode is a subject in motion. For example, even if a person is the subject, the person is in a situation such as participating in a sporting event, is dancing, or the like, and accordingly, the person thereof is in no situation to carefully view the front display panel 6F.

That is to say, in the case of these imaging modes, a situation is assumed wherein there is no person in front, or even if there is a person in front, the front display panel 6F is displayed with poor visibility, or the person thereof is not in a state to view the front display panel 6F.

Thus the CPU 31 turns the front display panel 6F off in step F103 in the case that the imaging mode is one of a night scene mode, scenery mode, high-speed shutter mode, and high sensitivity mode.

Note that the above modes are examples, in addition to those, an evening view mode wherein imaging is executed with settings suitable for evening view imaging, a macro mode suitable for closeup of objects such as plants, insects, or the like, a firework mode suitable for imaging of fireworks, an underwater mode suitable for imaging under water, or the like, is provided in some cases. Also, a snow mode wherein imaging is executed with settings capable of expressing ski slopes and silvery snow of snow-covered landscapes as they appear to the human eye, a beach mode wherein imaging is executed with settings whereby the blue of the sea and sky is highlighted, or the like is provided in some cases.

In these cases as well, it should be set beforehand how to determine in step F101 (whether or not the imaging mode is included in the predetermined imaging modes to execute the display of the front display panel 6F) according to whether or not there is a person, the visibility of the display content of the front display panel 6F, and the situation of a person on the subject side.

That is to say, according to the processing example in FIG. 6A, during the monitoring, the possibility that a person exists on the front side (subject side), or the visibility of the front display panel 6F, is estimated according to the imaging mode. In the case there is a great possibility that a person who will view the monitoring image on the front display panel 6F is on the front side, and that the possibility is great of being in a state of viewing with good visibility, the monitoring image is displayed on the front display panel 6F.

On the other hand, in the case of a great possibility of a person to view the front display panel 6F not being on the front side, or in the case of a state estimating that even if a person is there, visibility will not be good, the front display panel 6F is turned off.

For example, when a person is the subject, the user selects one of the night scene and person mode, portrait mode, "soft snap" mode, and smile shutter mode. In the case therein, the person that is the subject can view the front display panel 6F.

Therefore the person that is the subject can view the monitoring image that oneself is about to be imaged, and can confirm the expression, pose, and so forth of oneself. The display on the front display panel 6F can be effectively used such as confirming by oneself whether or not an expression is favorable for a photograph, for example.

On the other hand, in the case that the user performs imaging by selecting a night scene and person mode, portrait mode, "soft snap" mode, or smile shutter mode, the display on the front display panel 6F is turned OFF (only the front display panel 6F is in a power off state, for example), whereby power consumption can be reduced. That is to say, wasteful displays that no one is viewing, or wasteful displays having poor visibility, are not performed.

Figure 6B:
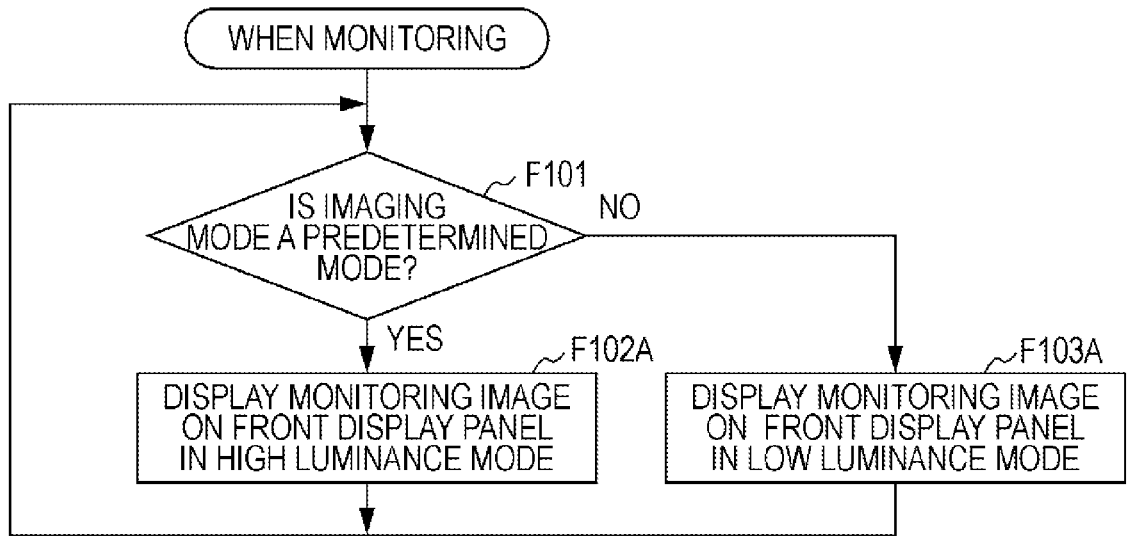

FIG. 6B is another processing example, and is an example of the front display panel 6F not being in the power off state, even if a person is not on the front side. Similar to FIG. 6A, in step F101 the CPU 31 branches the processing depending on the current imaging mode. In the case that a predetermined imaging mode is selected, such as night scene and person mode, portrait mode, "soft snap" mode, or smile shutter mode, the CPU 31 advances the flow to step F102A, and in the state that the display luminance of the front display panel is increased, instructs the display controller 7 to display the monitoring image.

Also, in the case that currently the imaging mode is other that the above-mentioned predetermined imaging modes, CPU 31 advances the flow to step F103A, and in the state that the display luminance of the front display panel 6F is decreased, instructs the display controller 7 to display the monitoring image.

That is to say, in the case that a person that can view the front display panel 6F exists, and estimation is made that visibility for the display is good, the display luminance of the front display panel 6F is increased so that the monitoring image can be viewed by the person. On the other hand, when assumed that there is no person in front, that visibility is too bad to view display, or the like, display luminance is decreased, and reduction in consumption power is realized. In the case that a display device made up of self emitting elements such as an organic EL panel is used as the front display panel 6F, decrease in display luminance is useful for reduction in consumption power.

Next, the processing example in FIG. 7 will be described. Similar to FIG. 6A, in step F101 the CPU 31 branches the processing depending on the current imaging mode. In the case that a predetermined imaging mode is selected, such as night scene and person mode, portrait mode, "soft snap" mode, or smile shutter mode, the CPU 31 advances the flow to step F103, and instructs the display controller 7 to display the monitoring image on the front display panel 6F.

Also, in the case that the imaging mode is other than the above predetermined imaging mode, the CPU 31 advances the flow to step F104, and performs processing such as reading out image data recorded on the recording medium 90 and so forth and preset image data and so forth. For example, the CPU 31 instructs the medium interface 10 to execute the playback of image data from the recording medium 90 (captured image data and so forth). Alternatively the CPU 31 executes reading out of the preset image data and captured image data from the flash ROM 33. The CPU 31 instructs the display controller 7 to display the read out image data thereof onto the front display panel 6F. That is to say as shown in FIG. 4C, image displaying that differs from the monitoring image is executed on the front display panel 6F.

In this case, in the case that a person that can view the front display panel 6F exists, and estimation is made that display visibility is good, the state thereof is as shown in FIG. 4B, and the person can monitor the image of oneself about to be photographed.

On the other hand, when estimating a state that no person is in front, or that the display can be viewed with poor visibility, an unrelated image is displayed on the front display panel 6F such as shown in FIG. 4C. Even if the person to be the subject does not exist, many times the state is such that a person is nearby. Also, there is a case where a person is in a situation wherein the person can readily view the display of the front display panel 6F, depending on the position of the person thereof.

For a person who is present in those circumferences, the display on the front display panel 6F can be recognized as a part of the external view design of the imaging apparatus 1, which would be interesting.

Also, in such a case, the user can select an image to be displayed on the front display panel 6F, whereby the user can set the external view of his imaging apparatus 1 arbitrarily, and accordingly, the user can enjoy camera use in more ways.

Note that the image data to be read out and displayed from the recording medium 90 may in some cases be text data or animation data.

Figure 8:
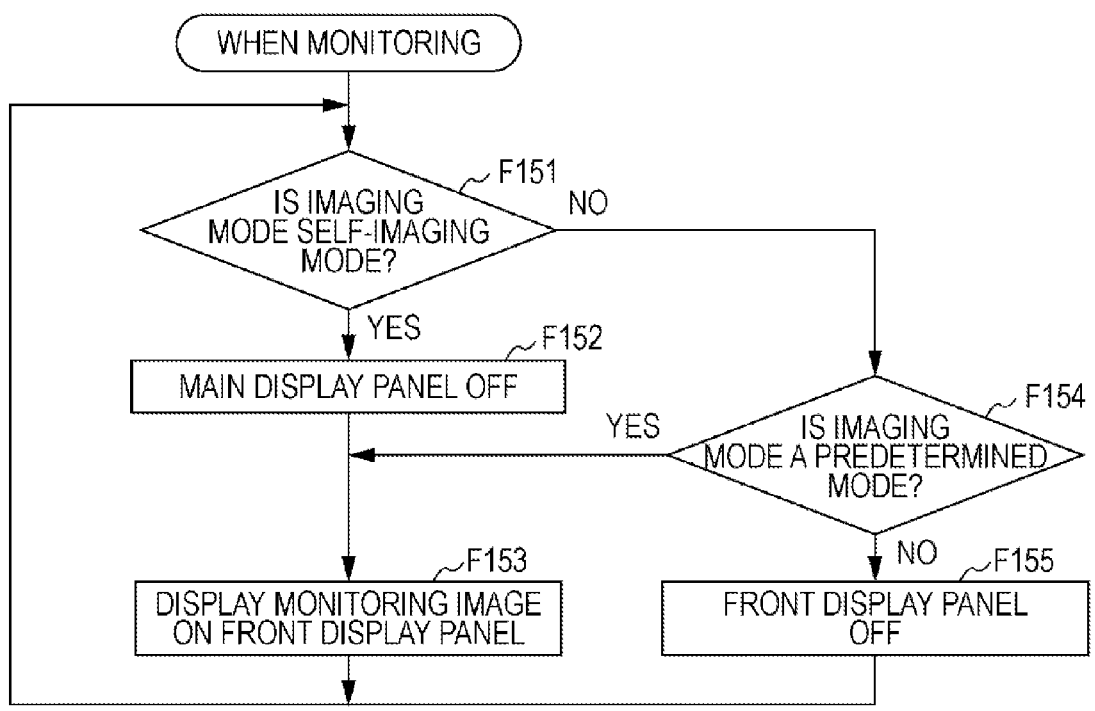
FIG. 8 is a flowchart of a display control example with consideration for a self-imaging mode on the front display panel of the embodiment.

Next, yet another processing example will be shown with FIG. 8. FIG. 8 is processing to correspond in the case that as one of the above-described imaging modes, a self-imaging mode can be selected. A self-imaging mode is an imaging mode in the case of the user facing the front side of the imaging apparatus 1 towards oneself.

In step F151 in FIG. 8, the CPU 31 confirms whether or not the current imaging mode is a self-imaging mode. In the case that the current imaging mode is a self-imaging mode, the CPU 31 advances the flow to step F152, and performs processing to turn off the display on the main display panel 6M. Control is performed to display the monitoring image on the front display panel 6F in step F153.

In the case that the imaging mode is other than a self-imaging mode, the CPU 31 confirms in step F154 whether or not a predetermined imaging mode is selected as the imaging mode, such as night scene and person mode, portrait mode, "soft snap" mode, or smile shutter mode.

In the case of a predetermined imaging mode, the flow is advanced to step F153, and the display controller 7 is instructed to display a monitoring image on the front display panel 6F.

Also, in the case that imaging mode is other than the above predetermined imaging modes, the CPU 31 advances the flow to step F155, and controls the display on the front display panel 6F to be turned off.

That is to say, in the case that the self-imaging mode is selected as the user setting, the front display panel 6F and main display panel 6M are in the state shown in FIG. 5A. in the case of not being in the self-imaging mode, the state is similar to that in FIG. 6A.

In the case of the self-imaging mode, the user faces the imaging apparatus toward oneself and performs imaging operations, whereby the main display panel 6M is not viewable. Accordingly, the subject can be confirmed by viewing the monitoring image on the front display panel 6F. The main display panel 6M is turned off, whereby power consumption can be reduced.

Figure 7:
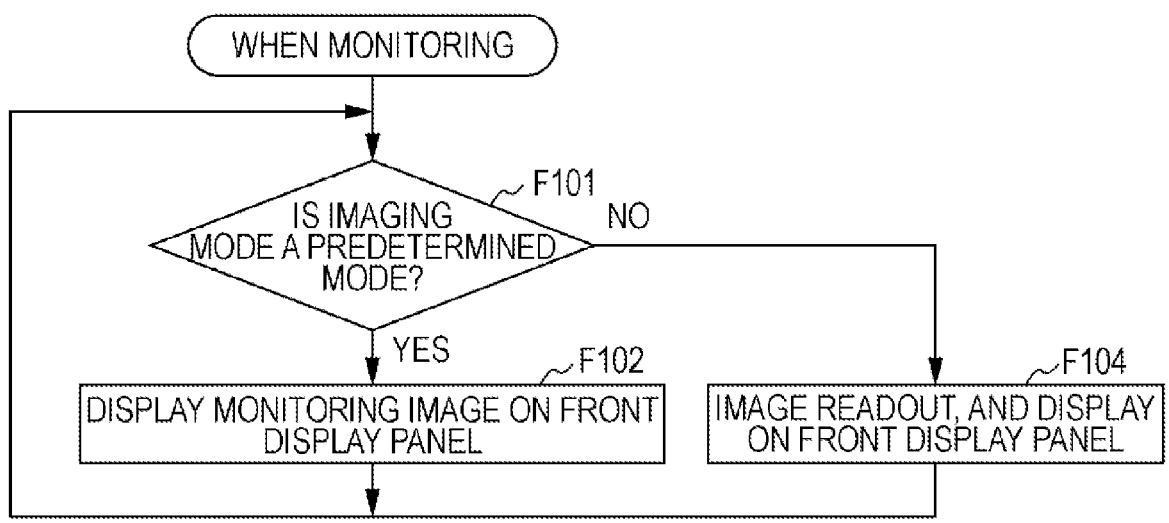
FIG. 7 is a flowchart of a display control example of a front display panel based on the imaging mode of the embodiment.

Note that as a modified example following the processing examples in FIG. 8, other than turning off the display of the front display panel 6F, processing examples may be considered in step F155 such as displaying in a low-luminance state such as described with FIG. 6A, or displaying a playback image or preset image as described with FIG. 7.

<4-2: Processing Example Based on Imaging Mode and User Settings>

In FIGS. 6 through 8 above, examples of controlling the display state of the front display panel 6F according to imaging mode have been described, but here an example will be described to perform display control of the front display panel 6F with consideration for other user setting states as to the imaging device 1, in addition to the imaging mode.

The imaging mode is one of the user settings, but let us say that the user's setting mentioned here is a setting state according to the user's operation other than the imaging mode setting, for example, such as flash emission setting, zoom position operation, or the like.

Figure 9:
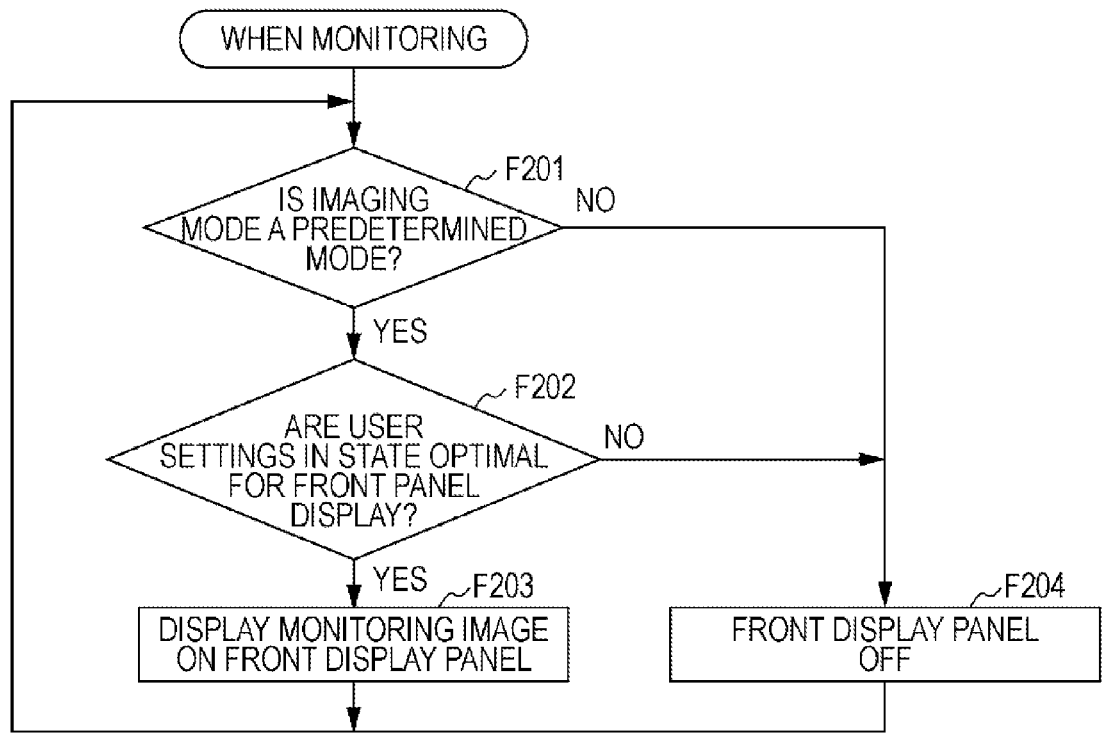
FIG. 9 is a flowchart of a display control example of the front display panel based on the imaging mode and user settings of the embodiment.

FIG. 9 shows a display control example that the CPU executes for the front display panel 6F during the monitoring period.

The monitoring image obtained with the imaging system 2, camera DSP 4 is displayed on the main display panel 6M during the monitoring period. That is to say, the CPU 31 executes control to display the imaging data supplied from the camera DSP 4 on the main display panel 6M as a through image during the monitoring period. At this time, in order to perform display control for the front display panel 6F, the CPU 31 performs the processing in FIG. 9 in parallel.

In step F201 the CPU 31 branches the processing depending on whether the current imaging mode is a predetermined imaging mode suitable to the display of the monitoring image on the front display panel 6F. That is to say, confirmation is made as to whether or not a predetermined imaging mode, such as night scene and person mode, portrait mode, "soft snap" mode, or smile shutter mode, is selected as the imaging mode.

In the case of a predetermined imaging mode suitable to the display of the monitoring image on the front display panel 6F, the CPU 31 advances the flow to step F202, and branches the processing depending on whether or not the user setting state other than the current imaging mode is a setting state suitable to the display of the monitoring image on the front display panel. In the case determination is made that the user setting state is a setting state suitable to the display of the monitoring image on the front display panel, the flow is advanced to step F203, and displaying of the monitoring image is executed with the front display panel 6F. That is to say, the display controller 7 is instructed to display the monitoring image displayed on the main display panel 6M also on the front display panel 6F. In this case, the display states of the main display panel 6M and the front display panel 6F are states such as shown in FIG. 4B.

On the other hand, in the case determination is made in step F201 that the imaging mode is not the above predetermined imaging mode, the CPU 31 advances the flow from step F201 to F204, and controls the display of the front display panel 6F to be off. Also in the case determination is made in step F202 that the user settings other than the imaging mode is not a setting state suitable to the display of the monitoring image for the front display panel 6F, the CPU 31 advances the flow to step F204, and controls the display of the front display panel 6F to be off. In these cases, the display states of the main display panel 6M and the front display panel 6F are states such as shown in FIG. 4A.

The CPU 31 repeatedly executes the processing FIG. 9 herein during the monitoring period. Accordingly, during the monitoring period, when the predetermined imaging mode is selected and the user setting state is a predetermined state at the point in time thereof, the monitoring image is displayed on the front display panel 6F as shown in FIG. 4B.

On the other hand, as a scenery mode or the like, basically when a subject scene that does not include a person is targeted, or when using a predetermined imaging mode such as portrait mode or the like but the user setting state is not a predetermined state, the front display panel 6F is turned off as shown in FIG. 4A.

User settings are flash emission settings, zoom position operations, and so forth for example, as mentioned above. The application of the processing in FIG. 9 for each is as follows.

The flash emission setting of the user's settings will be considered as follows. The flash emission setting is a setting wherein the user selects whether to execute flash emission (flash-on), whether not to execute flash emission (flash-off), or whether to automatically execute flash emission on/off (flash-auto). In this case, a case where the user sets flash-on is usually a situation in which the surroundings are dark. In the case of a dark situation, a monitoring image during the monitoring period is in a low luminance state, and accordingly, the visibility of the display of the front display panel 6F can be conceived to be poor.

Thus, regarding the flash emission settings, in the case of "flash: on", the CPU 31 advances to step F204, and the display of the front display panel 6F is controlled to be off.

The zoom position operation setting of the user's settings will be considered as follows. The zoom position setting is a zoom position setting, for example, in the case of the user operating the wide/tele operating key 5c in FIG. 1A to perform a zoom operation.

For example, even if a person has been set as a subject, when the zoom position is at the tele side (telephoto) exceeding a predetermined position, the subject person thereof can be assumed to be positioned far away from the imaging apparatus 1. It goes without saying that if the subject person is too far away from the imaging apparatus 1, the person thereof will have difficulty in viewing the display of the front display panel 6F suitably.

Thus, in the case that the zoom position by the user operation is a position in a distant state more than predetermined in step F202, the CPU 31 advances the flow to step F204, and controls the display of the front display panel 6F to be off.

In step F203 in FIG. 9, by the CPU 31 making determinations according to the user settings as described above, suitable display controls can be performed for the front display panel 6F. In other words, according to the processing in FIG. 9, in the case estimation is made that a person who can view the front display panel 6F exists or that the display visibility is good, the person on the subject side can monitor the image of themselves.

Therefore the person that is the subject can view the monitoring image that oneself is about to be imaged, and can confirm the expression, pose, and so forth of oneself. On the other hand, when estimated that a person is not in front, or that visibility is poor and the state is such that the display is not viewable, the front display panel 6F display is turned off (e.g. only the front display panel 6F is in a power off state). Thus, power consumption can be more suitable reduced.

Note that a flash emission setting and zoom position operation have been described above as user settings, but the determination made using both of these may be performed in step F202, or determination using only one of the user settings may be made in step F203.

Also, sensitivity settings, blurring correction on/off settings, specialized imaging settings and so forth can be assumed as user settings besides those described above. Each of these can also be conceived to be reflected in the determination of step S202 depending on whether or not a suitable situation is assumed regarding behavior wherein a subject person views the display of the front display panel 6F suitably.

Also, as a modified example according to the processing example in FIG. 9, besides turning the display off on the front display panel 6F, processing examples may be considered such as displaying in a lower luminance state as described with FIG. 6B or displaying a playback image or preset image as described in FIG. 7.

<4-3: Processing Example Based on Imaging Mode and Internal Detecting Information>

Next, an example to perform display control of the front display panel 6F will be described with consideration for camera detection information (internal detection information) that the imaging apparatus 1 internally detects, in addition to imaging mode.

The camera detection information mentioned here is information detected by the internal sensor of the imaging apparatus 1, information that the CPU 31 can recognize in accordance with the operation control of the imaging apparatus 1, e.g., external light quantity detection information used for flash control or exposure control, zoom position information, focus information, shaking detection information, subject distance information, or the like.

Figure 10:
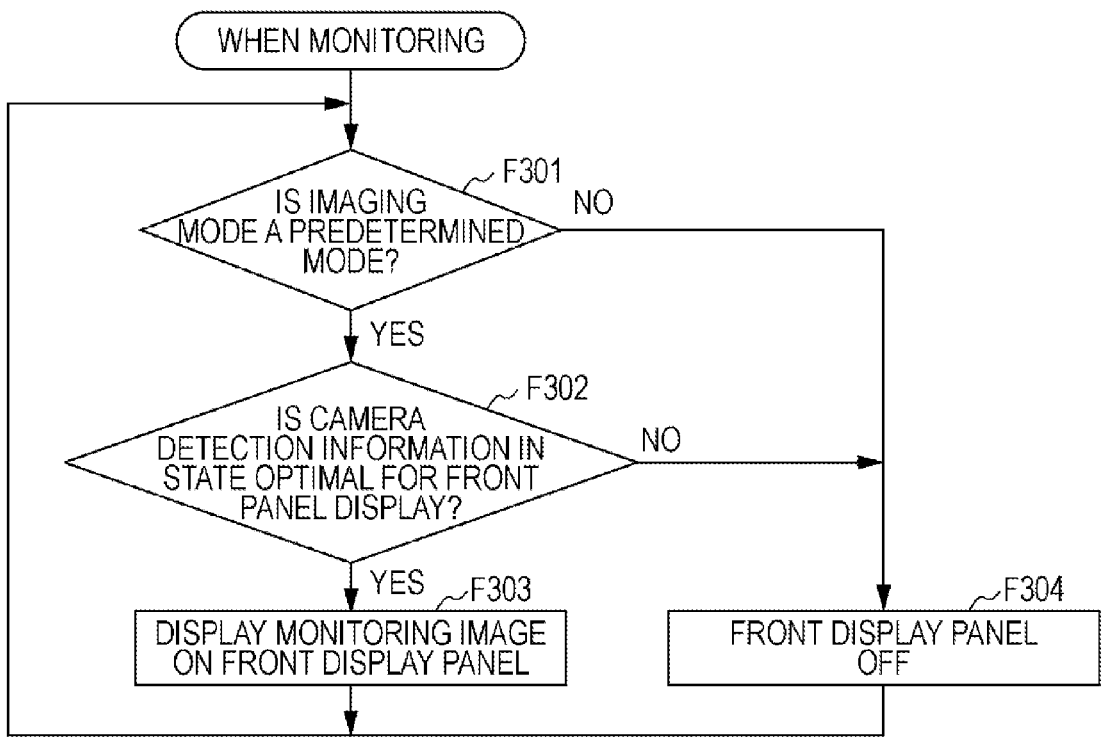
FIG. 10 is a flowchart of a display control example of the front display panel based on the imaging mode and camera detection information of the embodiment.

FIG. 10 shows a display control example of the CPU to execute of the front display panel 6F during the monitoring period.

During the monitoring period, the CPU 31 executes control to display the captured image data supplied from the camera DSP 4 as a through image on the main display panel 6M, but the processing in FIG. 10 for performing display control for the front display panel 6F is performed in parallel therewith.

In step F301, the CPU 31 branches the processing depending on whether the current imaging mode is a predetermined imaging mode suitable to the display of the monitoring image on the front display panel 6F. That is to say, the CPU 31 confirms whether or not a predetermined imaging mode such as night scene and person mode, portrait mode, "soft snap" mode, or smile shutter mode is selected.

In the case of confirming that currently a predetermined imaging mode is used, the CPU 31 advances the flow to step F302, confirms predetermined camera detecting information, and branches the processing depending on whether or not the state is suitable for displaying the monitoring image on the front display panel 6F.

In the case determination is made that the state is currently suitable for displaying the monitoring image on the front display panel 6F, the CPU 31 advances the flow to step F303, and executes the monitoring image display on the front display panel 6F. That is to say, the display controller 7 is instructed to display the monitoring image displayed on the main display panel 6M also on the front display panel 6F. In this case, the display states of the main display panel 6M and the front display panel 6F are states such as shown in FIG. 4B.

On the other hand, in the case the CPU 31 confirms that currently a predetermined imaging mode is not used in step F301, the CPU 31 advances the flow to step F304, and controls the display of the front display panel 6F to be turned off. Also, in step F302, also in the case determination is made that the state is not suitable for displaying the monitoring image on the front display panel 6F, the CPU 31 advances the flow to step F304, and controls the display on the front display panel 6F to be turned off. In these cases the display states of the main display panel 6M and the front display panel 6F are states such as shown in FIG. 4A.

The CPU 31 repeatedly executes the processing in FIG. 9 during the monitoring period. Accordingly, when the user selects a predetermined imaging mode during the monitoring period, and that the state recognized by the camera detecting information at that point in time is a predetermined state, a monitoring image is displayed on the front display panel 6F as shown in FIG. 4B.

On the other hand, when selecting a imaging mode other than the above-mentioned predetermined imaging modes such as scenery modes or the like, or when the state recognized by the camera detecting information is not a predetermined state even when a predetermined imaging mode has been selected, the front display panel 6F is turned off as shown in FIG. 4A.

The camera detecting information is external light quantity detection information, zoom position information, subject distance information, focus information, shaking detection information, or the like, for example. The determination in step F302 using the camera detecting information herein is as follows.

An external light quantity can be detected from the luminance average value of captured image data, a weighted luminance average value obtained by applying weighting to a portion within a screen, or the like, and these are commonly used for automatic exposure control, flash emission control in the case of the flash emission setting is auto, or the like. These luminance values are calculated, for example, at the image signal processing unit 41 of the camera DSP 4, whereby the CPU 31 can obtain the information thereof.

Also, though not shown in FIG. 2, an arrangement may be made wherein an external light quantity sensor or the like is provided, and external light quantity is detected directly.

In the case that the external light quantity detected with these techniques is low, a situation can be assumed wherein even if a monitoring image or the like is displayed on the front display panel 6F, the luminance of the screen itself is low, and accordingly, no excellent visibility can be obtained. Also, when shooting against a bright background, where the external light quantity level is too high, a situation can be assumed wherein it will be difficult to visually recognize the monitoring display of the front display panel 6F suitably.

Thus, even in the case that a predetermined imaging mode is selected, in the case that the external light quantity is lower than a predetermined level or a backlighting state is determined, the CPU 31 determines the state to be not suitable to displaying the monitoring image on the front display panel 6F, the flow is advanced from step F302 to F304, and the display of the front display panel 6F is controlled to be turned off.

With regard to the zoom position information, the CPU 31 drives and controls the zoom lens according to the user's operation, whereby the zoom position can be detected. Even if a person has been set as a subject, when the zoom position is in the tele side (telephoto) exceeding a predetermined position, the subject person thereof can be assumed to be positioned far away from the imaging apparatus 1. That is to say, the subject person can be assumed not to be capable of viewing the display of the front display panel 6F suitably.

Thus in step F302, in the case that the zoom position is a position in a distant state greater than predetermined, the CPU 31 advances the flow to step F302, and controls the display of the front display panel 6F to be turned off.

The subject distance information is the information of distance from the imaging apparatus 1 to a subject. The CPU 31 can obtain the subject distance information using the information from the lens position detecting unit 27 as described above. For example, even if a person has been set as a subject, in the case that determination can be made that the subject person thereof is in a position far away from the imaging apparatus 1, the subject person can be assumed not to be capable of viewing the display of the front display panel 6F suitably.

Thus in step F302, in the case that the subject is detected to be farther than a predetermined position by the subject distance information, the CPU 31 advances the flow to step F302, and controls the display of the front display panel 6F to be turned off.

The focus information is the determination information of a focused state used for a process for autofocus at the image signal processing unit 41.

In the case of not a focused state, the CPU 31 determines that suitable monitoring image display is not executable, the flow is advanced from step F302 to F304, and controlling the display of the front display panel 6F to be turned off can be considered. That is to say, only in the case of a focused state is the monitoring display to be executed with the front display panel 6F.

The blurring detection information is the detection information of shaking, and the motion of the imaging apparatus 1. The CPU 31 can obtain the blurring detection information, for example, as the information from the blurring detecting unit 13.

In the case that shaking is great, or in the case that the user is moving the imaging apparatus 1 to follow a moving subject, or the like, the monitoring image on the front display panel 6F will not be visually recognized suitably. Thus in step F302, in the case that blurring or the movement of the imaging apparatus 1 is determined to be great by the blurring detecting information, the CPU 31 advances the flow to step F304, and controlling the display of the front display panel 6F to be turned off can be considered.

In step F302 in FIG. 10, suitable display control can be performed for the front display panel 6F by the CPU 31 making a determination according to all or part of the various types of camera detecting information as described above.

That is to say, according to the processing in FIG. 10, when a predetermined imaging mode is selected and a predetermined state suitable to the monitoring image display with the front display panel 6F from the camera detecting information, the monitoring image is displayed with the front display panel 6F.

Therefore the person that is the subject can view the monitoring image that oneself is about to be imaged, and can confirm the expression, pose, and so forth of oneself. However, in the case an assumption is made that the state is not suitable to displaying the monitoring image on the front display panel 6F, the front display panel 6F display is turned off. Thus, power consumption can be more suitable reduced.

Note that as a modified example according to the processing example in FIG. 10, in step F305, besides turning the display of the front display panel 6F off, displaying in a low luminance state as described with FIG. 7, or displaying the playback image or preset image as described with FIG. 8 may be considered.

<4-4: Processing Example Based on Imaging Mode and Image Analysis Information>

Next, an example to perform display control of the front display panel 6F will be described with consideration for image analysis information, in addition to imaging mode. The image analysis information is information obtained by an image analyzing process that the image analyzing unit 44 executes.

Figure 11:
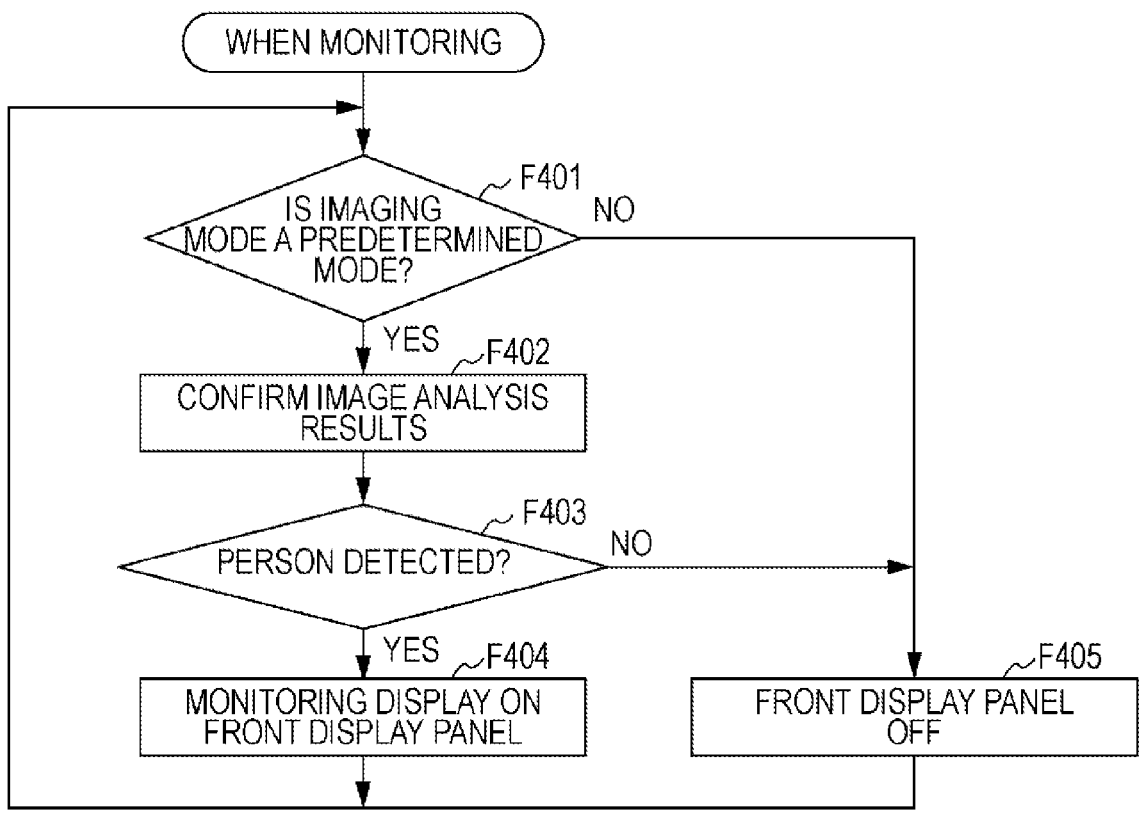
FIG. 11 is a flowchart of a display control example of the front display panel based on the imaging mode and image analysis results of the embodiment.

FIG. 11 shows a display control example that the CPU executes for the front display panel 6F during the monitoring period.

As described above, in the monitoring period, a monitoring image obtained in the processing of the imaging system and camera DSP 4 is displayed on the main display panel 6M. That is to say, during the monitoring period, the CPU 31 executes control to display the captured image data supplied from the camera DSP 4 on the main display panel 6M as a through image.

At this time, in order to perform display control for the from display panel 6F, the CPU 31 performs the processing in FIG. 11 in parallel with the display control of the main display panel 6M.

In step F401, the CPU 31 branches the processing depending on whether the current imaging mode is a predetermined imaging mode suitable to the display of the monitoring image of the front display panel 6F. That is to say, the CPU 31 confirms whether or not a predetermined imaging mode, such as night scene and person mode, portrait mode, "soft snap" mode, smile shutter mode, or the like is selected as the imaging mode.

In the case of confirming the current mode to be an above-mentioned imaging mode, the CPU 31 advances the flow to step F402, and confirms the image analysis results with the image analysis unit 44.

The image analyzing unit 44 executes the image analyzing process regarding the captured image data imaged at the imaging system 2 and captured in the camera DSP 4 during the monitoring period. For example, the image analyzing unit 44 executes the image analyzing process regarding the image data of each frame processed at the image signal processing unit 41, or the image data of a frame extracted intermittently from the frames processed at the image signal processing unit 41. Whether or not an image to be recognized as a person is included in the captured image data serving as an analyzing target is determined, i.e., whether or not an outline portion to be recognized as a person is included within an image is determined. Subsequently, the image analyzing unit 44 supplies the determining result thereof to the CPU 31. In step F402, the CPU 31 confirms whether or not presence of a person has been recognized as the determining result thereof.

In the case that the existence of a person is confirmed as an image analysis result, the CPU 31 advances the flow to step F404, and executes the monitoring image display with the front display panel 6F. That is to say, the display controller 7 is instructed to display the monitoring image displayed on the main display panel 6M also on the front display panel 6F.

In this case, the display states of the main display panel 6M and the front display panel 6F are states such as shown in FIG. 4B.

On the other hand, in the case confirmation is made in step F401 that the current mode is not a predetermined imaging mode, the CPU 31 advances the processing to step F405, and controls the display of the front display panel 6F to be turned off. Also, in the case confirmation is made by the image analysis result confirmation in step F402 that a person does not exist, the CPU 31 advances the flow from step F403 to F405, and controls the display of the front display panel 6F to be turned off.

In this case, the display states of the main display panel 6M and the front display panel 6F are states such as shown in FIG. 4A.

The CPU 31 repeatedly executes the processing in FIG. 9 during the monitoring period. Accordingly, when the user selects a predetermined imaging mode and faces the imaging apparatus 1 so that the person becomes the subject during the monitoring period, a monitoring image is displayed on the front display panel 6F.

Also, when selecting a imaging mode other than the predetermined imaging modes or when targeting a subject scene that does not include a person such as scenery or the like, the front display panel 6F is turned off. Note that in the case a predetermined imaging mode is selected, at the point in time that a person is to be included in the subject, the monitoring image is to be displayed on the front display panel 6F.

That is to say, according to the processing example herein, not only is the on/off of the display of the front display panel 6F controlled, in the case of the above predetermined imaging modes, the monitoring image is displayed on the front display panel 6F in the case that a person exists as a subject on the front side.

When a person becomes a subject, the person that is the subject can view the front display panel 6F. Also, since the imaging mode is a predetermined imaging mode, the visibility is assumed to be in a good state. Therefore the person that is the subject can view the monitoring image that oneself is about to be imaged, and can confirm the expression, pose, and so forth of oneself. The display on the front display panel 6F can be effectively used such as confirming by oneself whether or not an expression is favorable for a photograph, for example.

On the other hand, in the case that a person does not exist as the subject, determination is made that there is no one to view the front display panel 6F. Accordingly, the display on the front display panel 6F is turned off (only the front display panel 6F is in a power off state, for example), whereby power consumption can be reduced. That is to say, wasteful displays that no one is viewing are not performed.

Note that in step F402, determination is made as to whether or not there is a person on the front side as a subject, by the image analysis results of the image analysis unit 44, but in step F402, processing to confirm the detection results of the approximation sensor 50 shown in FIG. 2 may be performed. Also, in step F402, both of the image analysis result and the detection result of the proximity sensor 50 may be confirmed.

Figure 12:
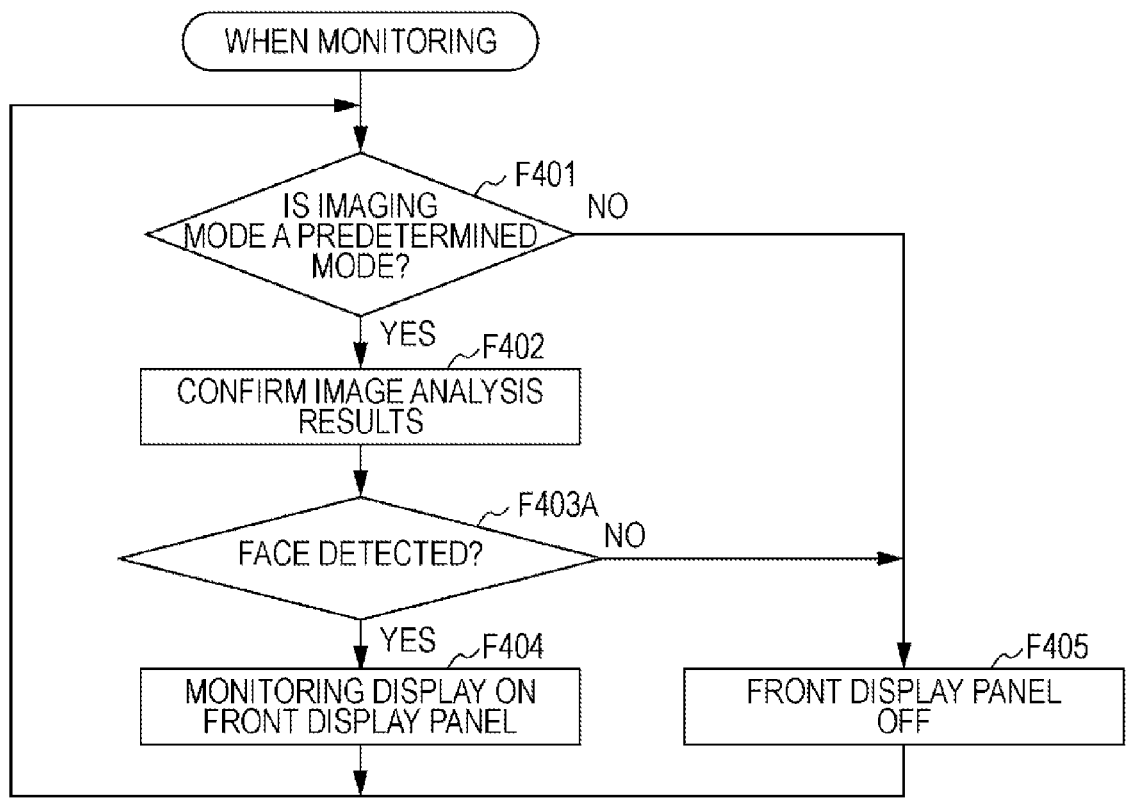
FIG. 12 is a flowchart of a display control example of the front display panel based on the imaging mode and image analysis results of the embodiment.
Figure 13:
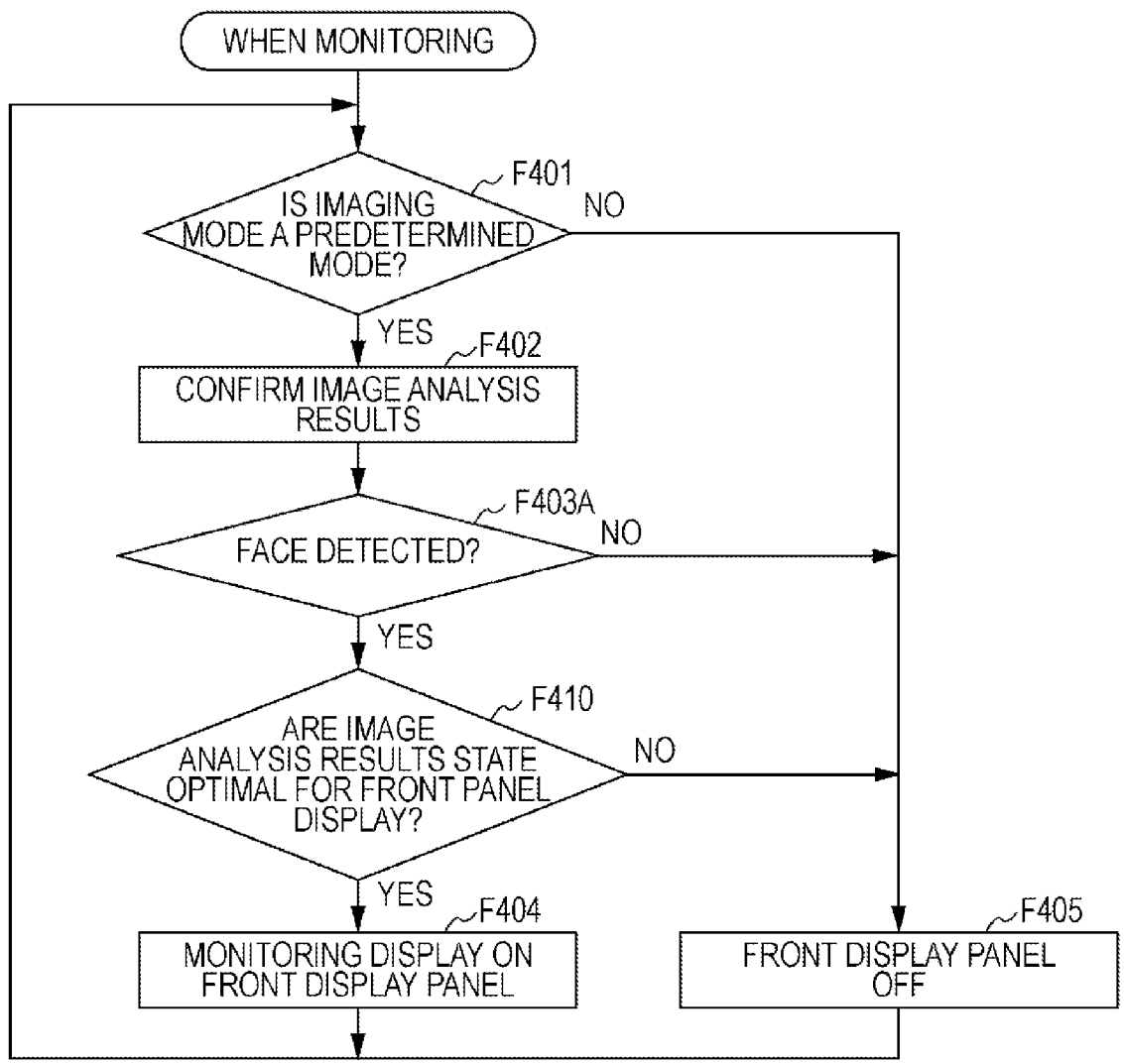
FIG. 13 is a flowchart of a display control example of the front display panel based on the imaging mode and image analysis results of the embodiment.
Figure 14:
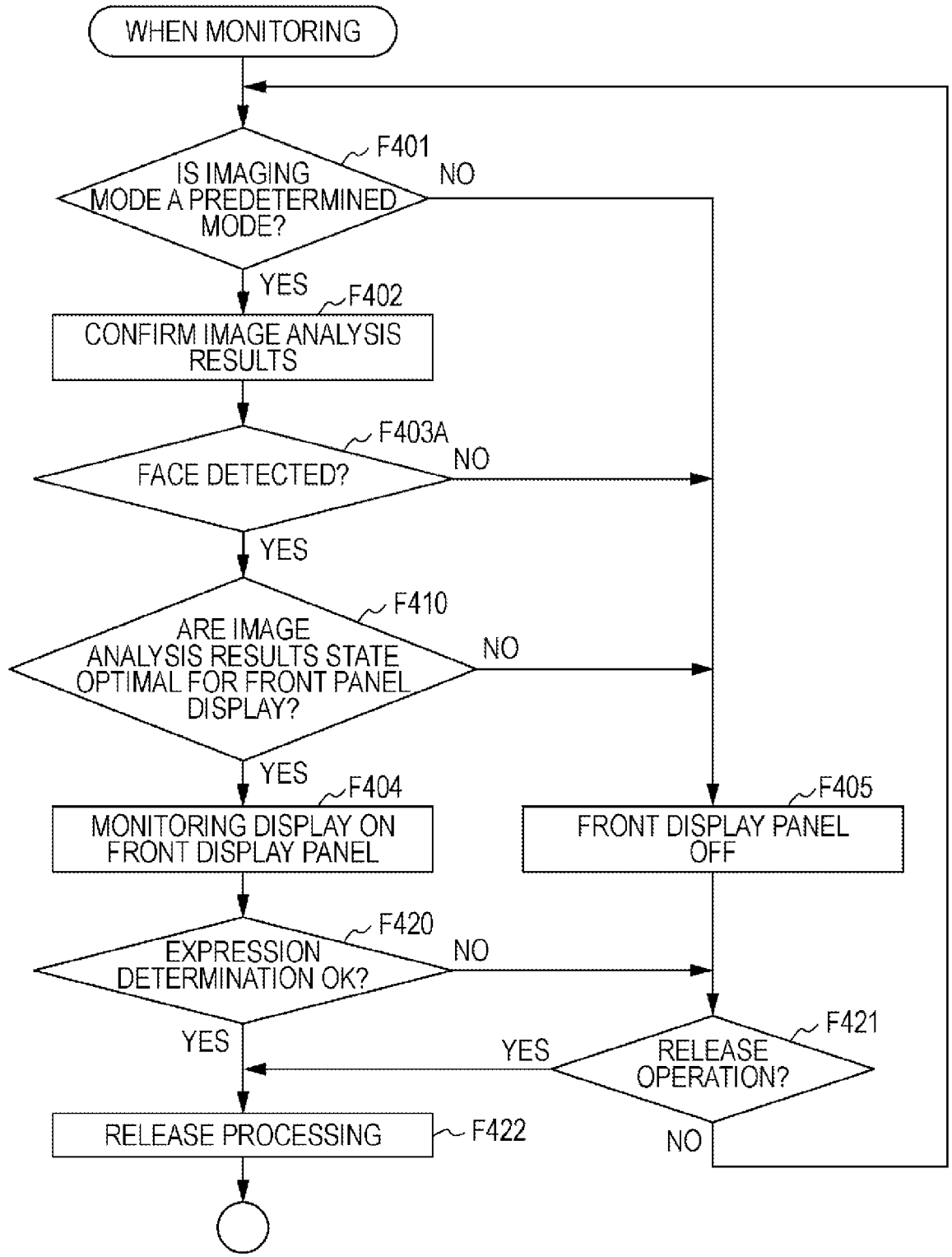
FIG. 14 is a flowchart of a display control example of a front display panel with consideration for a smile shutter mode of the embodiment.

Also, determining the existence of a person on the front side by performing face detection with the image analysis has been described with the various processing examples in FIGS. 12 through 14, the modified examples using the approximation sensor 50 can similarly consider the cases of FIGS. 12 through 14 also.

Now, the processing in FIG. 11 performs person detection and controls the display operation of the front display panel 6F, but as person detection, detection of a "face" may be performed.

For example, the image analyzing unit 44 determines presence of an outline to be recognized as a face, and presence of a facial element such as the eyes, nose, mouth, or the like from captured image data, and determines whether or not a person's face serving as a subject is included in the captured image data.

The processing of the CPU 31 in this case is shown in FIG. 12. Note that steps F401, F402, F404, and F405 in FIG. 12 are similar to FIG. 11. In step F402 the CPU 31 confirms the image analysis results of the image analysis unit 44 and determines whether or not a "face" exists. If a "face" is detected, the flow is advanced from step F403A to F404, and the monitoring image display is executed with the front display panel 6F, and on the other hand if a "face" is not detected, the flow is advanced from step F403A to F405 and the front display panel 6F is turned off. Thus, instead of determination of the whole of a person's body, the presence of a person in front may be confirmed by determination of a face.

Next, an example of performing display control of the front display panel 6F will be described with consideration for various analysis result information in addition to person recognition, as an image analysis result performed with the image analysis unit 44.

Various types of image recognition results can be obtained by other than person recognition and face recognition depending on the image analyzing process at the image analyzing unit 44. For example, the determination information of an external light quantity can be obtained. Also, the relative motion quantity between the imaging apparatus 1 and the subject can be determined according to motion detection of frame comparison, analysis of a blurring quantity for each pixel, or the like.

Further, as the image recognition process in the case that a face image has been detected, the size of a face (the percentage of a facial portion occupied within the image of one frame), facial orientation, the direction in which the eyes of the subject are directed, or the like within the screen can also be obtained as analysis results.

Now, a case of thus using more various types of image analysis results will be described. FIG. 13 shows a display control example for the CPU 31 to execute for the front display panel 6F during the monitoring period. Note that steps F401, F402, F403A, F404, and F405 are similar to FIG. 12.

In step F401, the CPU 31 branches the processing depending on whether the current imaging mode is a predetermined imaging mode suitable for displaying the monitoring image on the front display panel 6F. In the case that the current imaging mode is not a predetermined imaging mode suitable for displaying the monitoring image on the front display panel 6F, the display of the front display panel 6F is controlled to be turned off in step F405.

In the case that the current imaging mode is a predetermined imaging mode suitable for displaying the monitoring image on the front display panel 6F, the CPU 31 confirms the analysis results with the image analysis unit 44 in step F402. However with the present example, not only detection of the existence of a face, but other various types of image recognition processing is performed as described above, and the CPU 31 confirms the analysis result information thereof.

If a "face" of a person is detected, the flow is advanced from step F403A to F405, and control is performed to turn the display of the front display panel 6F off.

If a "face" of a person is detected as the analysis result by the image analysis unit 44, the CPU 31 branches the processing according to other image analysis results in step F410. That is to say, CPU 31 confirms the image analysis results other than the face, and determines whether or not the state is suitable to display the monitoring image on the front display panel 6F.

In the case that the CPU 31 determines from the various types of image analysis results that the state is suitable to display the monitoring image on the front display panel 6F, the flow is advanced to step F404, and the monitoring image display is executed with the front display panel 6F. That is to say, the display controller 7 is instructed to display the monitoring image displayed on the main display panel 6M also on the front display panel 6F. In this case, the display states of the main display panel 6M and the front display panel 6F are states such as shown in FIG. 4B.

On the other hand, in the case determination is made from other analysis results in step F410 that the state is not suitable to display the monitoring image on the front display panel 6F, the CPU 31 controls the display of the front display panel 6F to be turned off in step F405.

In the event of advancing to step F405 from step F401, F403A, or F410, the display state on the main display panel 6M and front display panel 6F.

The CPU 31 repeatedly executes the processing in FIG. 9 during the monitoring period. Accordingly, during the monitoring period when the user selects a predetermined imaging mode and faces the imaging apparatus 1 so that the face of the person is included in the subject, and the state recognized by the various types of image analysis results at the point in time thereof is a predetermined state, the monitoring image is displayed on the front display panel 6F. On the other hand, in the case that the imaging mode is not a predetermined imaging mode, or even if in a predetermined imaging mode the person (face) is not included in the subject, further, in the case of a predetermined imaging mode and the face is included in the subject but the state recognized by various types of analysis results is not a predetermined state, the front display panel 6F is turned off.

A processing example of step F410 according to the image analysis results other than the existence of a face is as follows. External light quantity can be determined as image analysis results. In the case the external light quantity is low, or excessively high such as when shooting into bright light or the like, the monitoring display on the front display panel 6F can be assumed not to be recognized suitably, as described above with the camera detection information.

Thus, even in a case that face detection is made in a predetermined imaging mode, in a case wherein determination is made that the external light quantity is lower than a predetermined level or is in a backlighting state, the CPU 31 deems the state to not be suitable for displaying the monitoring image on the front display panel 6F. That is to say, in step F405 the display of the front display panel 6F is controlled to be turned off.

Also, the relative motion quantity between the imaging apparatus 1 and the subject can be determined to be the image analysis result. That is to say, a case where the imaging apparatus 1 itself is blurred or moving (the user is moving the imaging apparatus 1), or a case where the subject is moving, or a case where both are moving can be determined.

When the motion quantity in these cases is great, it can be conceived that even if there is a person serving as a subject, the subject person thereof will have difficulty in recognizing the front display panel 6F suitably.

Thus in step F410, in the case the CPU 31 determines that the relative movement of the imaging apparatus 1 and the subject is great, the flow is advanced to step F405, and the display of the front display panel 6F may be controlled to be turned off.

Not only simple face detection but also a face size (percentage of a facial portion within the screen) can be determined for image analysis. Though depending on the zoom position state, if a certain fixed zoom state is considered, the size of a face can serve as an index to determine the distance from the imaging apparatus 1 to the person serving as a subject. For example, in the case that even if the zoom state is a wide state, but a face is shot small, the person thereof can be assumed to be in the distance.

Therefore, in step F410 the CPU 31 determines the distance of a subject person based on the size of a face of the person thereof while taking the zoom position into consideration. Subsequently, in the case that the person thereof is in the distance, and has difficulty in viewing the display content of the front display panel 6F, in step F405 it can be conceived that the CPU 31 controls to the display of the front display panel 6F to be turned off.

Also, a facial orientation or the direction in which the eyes of the subject are directed can also be recognized for image analysis. In the case that a face is not in the front direction on a captured image, or in the case that the subject is not looking at the imaging apparatus 1, the subject person thereof can be determined not to be viewing the imaging apparatus 1, i.e., the front display panel 6F.

Therefore, in step F410 the CPU 31 confirms the facial orientation or the direction in which the eyes of the subject are directed. In the case determination is made that the person thereof is not looking at the display content of the front display panel 6F, the display of the front display panel 6F may be controlled to be turned off.

In step F410 in FIG. 13, suitable display control can be performed for the front display panel 6F, by the CPU 31 performing determinations according to the image analysis results as described above.

That is to say, according to the processing in FIG. 13, in a predetermined imaging mode, when face detection is made and the predetermined state from other image analysis results, the monitoring image is displayed with the front display panel 6F. In a situation wherein this is suitable as a situation wherein a person exists on the front side of the subject and which is estimated from the imaging mode, and the person on the subject side can suitable visually confirm (or is visually confirming) the monitoring image from the image analysis results, the monitoring image is displayed on the front display panel 6F. Accordingly, the monitoring image display of the front display panel 6F is performed in a state wherein the probability that the person that is the subject will view the display on the front display panel 6F is extremely high.

Also, in the case that a person that is a subject does not exist, or in the case that visibility is poor or a person exists but there is no reason to perform the monitoring image display on the front display panel 6F (not viewing or not viewable), the display on the front display panel 6F is turned off. Thus, power consumption can more suitably be reduced.

Next FIG. 14 shows a modified example of the processing example in FIG. 13 which is applicable in the case of the smile shutter mode described above as one of the imaging modes. Other than F420 through F422 in FIG. 14, the flow is the same as FIG. 13. Note that in FIG. 13 a release operation by the user (trigger for moving to the imaging period) is not indicated, but the processing up to the imaging period is indicated as steps F420 through F422 in FIG. 14.

According to the image analysis processing, in addition to face detection and the various types of detections mentioned above, expressions of the subject person can also be determined. Thus, in the event that monitoring display is performed with the front display panel 6F according to the imaging mode, existence of a subject person, and other analysis results, the CPU 31 can confirm the results of the expression determination of the subject person in step F420.

In the case that a smiling state is obtained from the image analysis results as the expression determination, the flow is automatically advanced to step F422, and release processing, i.e. the recording processing of the captured image data at the point in time thereof is performed. Note that in the case that the user manually has performed a release operation, the flow is advanced from step F421 to F422 and release processing is performed.

Thus, by combining the monitoring display on the front display panel 6F and the smile shutter mode processing, the person that is the subject can view one's own expression on the front display panel 6F and smile, whereby the recording of the captured image can be performed.

Note that in the modified examples according to the processing examples in FIGS. 11 through 14, in step F405, besides turning the display of the front display panel 6F off, displaying in a low luminance state as described with FIG. 6B, or displaying the playback image or preset image as described with FIG. 7 may be considered.

Also, in the processing examples in FIGS. 12 through 14, determination is made as to whether or not a person who can visually confirm the front display panel is on the front side, by the face detection by the image analysis, but a person detection (detection of a body of a person within an image) instead of face detection may be used. Also, detection results from an approximation sensor 50 may be used.

5. Display Control of the Front Display Panel Unit when Playing

The various processing examples described up to this point are control processing examples of the front display panel 6F during the monitoring period, but now a display control example of the front display panel 6F during the playback period will be described.

Figure 3:
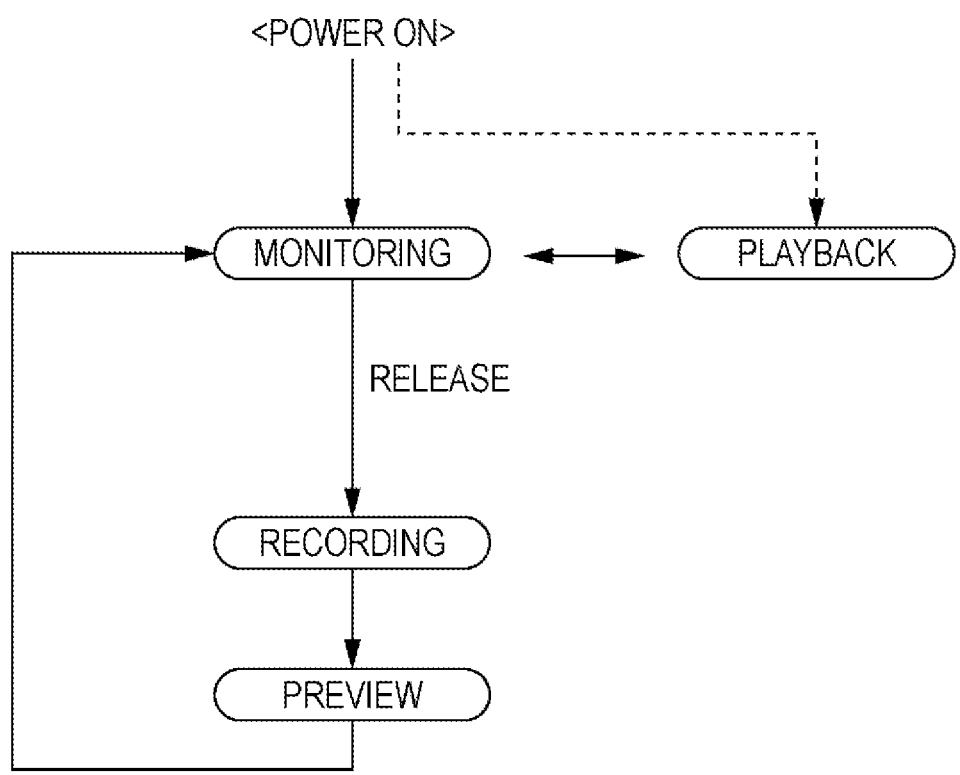
FIG. 3 is an explanatory diagram of the operation transition of the imaging apparatus according to the embodiment.

As described in FIG. 3, in the case that the user has performed an operation to instruct a playback operation, the imaging apparatus 1 proceeds to a playback operation state (playback period). During the playback period, an operation to play the image recorded in the recording medium 90 or flash ROM 33 is executed.

The CPU 31 reads out the image recorded in the recording medium 90 or flash ROM 33 in response to the user's operation, and instructs the display controller 7 to display thumbnail images or a playback image on the main display panel 6M.

Figure 15:
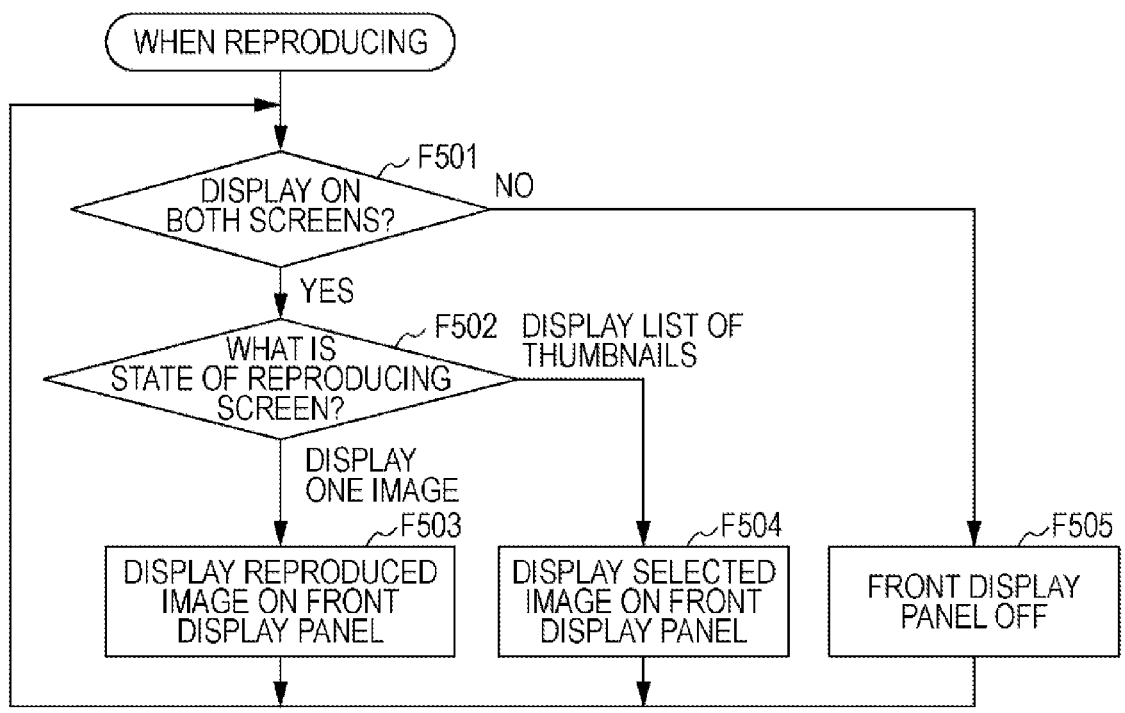
FIG. 15 is a flowchart of a display control example of a front display panel at time of playback of the embodiment.

At this time, the CPU 31 performs the processing in FIG. 15 relating to the front display panel 6F.

In step F501 in the playback period, the CPU 31 determines whether the display mode is a display mode to perform display on the main display panel 6M and the front display panel 6F, or a display mode to perform display only on the main display panel 6M. For example this display mode can be selected by a user operation.

If not a display mode to perform both screen displays, the CPU 31 advances the processing from the step F501 to F505, and executes control to turn the front display panel 6F. That is to say, the playing image display is performed only on the main display panel 6M.

If in a display mode to perform both screen displays, the CPU 31 advances the flow from step F501 to F502, and branches the processing according to the playing display state of the current main display panel 6M. That is to say, currently, the CPU 31 branches the process depending on whether a thumbnail list of playback images or a single image is displayed on the main display panel 6M.

In the case that a single playback image is now displayed on the main display panel 6M, the CPU 31 advances the process to step F503 to instruct the display controller 7 to display the same playback image data on the front display panel 6F as well. In this case, the display states of the main display panel 6M and the front display panel 6F are states such as shown in FIG. 5C.

On the other hand, in the case that a thumbnail list is now displayed on the main display panel 6M, the CPU 31 advances the process to step F504. In this case, the CPU 31 instructs the display controller 7 to display on the front display panel 6F playback image data selected by the cursor K on the thumbnail list display. In this case, the display states of the main display panel 6M and the front display panel 6F are states such as shown in FIG. 5B.

By the CPU 31 executing such a process, a person in the front side can also view on the front display panel 6F side simultaneously. Accordingly, the user of the imaging apparatus 1, and the person in the front side can enjoy a playback image.

Also, as shown in FIG. 5B, in the case that a thumbnail list is displayed on the main display panel 6M, the user of the imaging apparatus 1 moves the cursor K, whereby a person in the front side can view the selected playback image on the front display panel 6F side.

6. Modification Examples

The various types of process examples, and modifications serving as embodiments have been described so far, but further various modifications can be conceived as embodiments of the present invention.

For example, an arrangement may be made wherein, in the case that common monitoring image display is not executed on the front display panel 6F, an example is given wherein the display of the front display panel 6F is turned off, the display of the front display panel 6F is set to low-intensity display, or a playback image or preset image is displayed on the front display panel 6F, but the user can select which of these states to use.

With the present embodiment, examples for performing display control of the front display panel 6F have been described, under the assumption of whether or not the imaging mode is a predetermined imaging mode to estimate the state suitable for displaying the front display panel 6F, and further by combining user setting state, determinations by camera detecting information (internal detecting information), and image analysis results. These may be further combined.

For example, an example to perform display control of the front display panel 6F with the imaging mode, user setting state, and camera detecting information may be considered.

Also, an example to perform display control of the front display panel 6F with the imaging mode, user setting state, and image analysis results may be considered.

Also, an example to perform display control of the front display panel 6F with the imaging mode, camera detecting information, and image analysis results may be considered.

Also, an example to perform display control of the front display panel 6F with the imaging mode, user setting state, camera detecting information, and image analysis results may be considered.

Also, as a shooing mode, there are cases wherein an automatic mode is prepared besides the examples described above. An automatic mode is a mode wherein the CPU 31 sets suitable imaging parameters and controls the processing of the imaging system 2 and camera DSP 4 according to external-light state, image analysis, and the like.

In the case that an automatic mode is prepared as an imaging mode, for example the automatic mode may be one of the predetermined imaging modes suitable to the display of the front display panel 6F. Processing such as that in FIGS. 9 through 14 is applied, and the display state of the front display panel 6F is controlled according to the camera detecting information, user setting information, and image analysis results.

With the present embodiment, description is given under the assumption of a still image shoot. However, the present example can also be applied to a moving image. In the case of a moving image, the above-mentioned monitoring period is similar to a standby period until the imaging starts. The above-mentioned recording period is the moving image recording period from recording start until recording end. Accordingly, the moving image display control of the front display panel 6F is performed during the standby period and recording period.

If an imaging apparatus 1 can shoot both a still image and moving image, a moving image mode is prepared as one of the imaging modes. The moving mode herein goes to one of the predetermined imaging modes applicable to the display of the front display panel 6F. In the standby period and recording period, the processing such as that in FIGS. 9 through 14 is applied, and the display state of the front display panel 6F is controlled according to the camera detecting information, user setting information, and image analysis results.

With the present example, an apparatus generally called a digital still camera has been exemplified as the imaging apparatus 1, but an embodiment of the present invention can be applied to various types of apparatuses, for example, such as video cameras, cellular phones having imaging functions, PDAs (Personal Digital Assistant), and so forth.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
an image capturing part to capture light through a lens unit;
a first display disposed on a same side of the image processing apparatus as the lens unit;
a display control part to control display on the first display and on a second display, the second display being disposed on a side of the image processing apparatus other than the side on which the first display is disposed; and
an operation part for setting a capturing mode of the image processing apparatus to one of a plurality of modes including at least a moving subject mode and another capturing mode,
wherein the display control part controls the second display to display one or more monitoring images, and controls the first display to not display the one or more monitoring images, in a case that the capturing mode is set to the moving subject mode, and
wherein the display control part is operable to control the first display to display text data thereon.

2. The image processing apparatus according to claim 1, wherein the second display is disposed on a side of the image processing apparatus opposite the first display.

3. The image processing apparatus according to claim 1, wherein the display control part further controls displaying one or more thumbnail images corresponding to a captured image.

4. The image processing apparatus according to claim 1, further comprising a unit to set a frame rate of captured images.

5. The image processing apparatus according to claim 1, further comprising a unit to set a size configuration of at least one captured image.

6. The image processing apparatus according to claim 1, wherein at least one of the first display and the second display comprises a touch panel.

7. The image processing apparatus according to claim 1, further comprising an external interface to communicate with one or more external apparatuses.

8. The image processing apparatus according to claim 7, wherein the external interface comprises at least one of a universal serial bus (USB) interface and a wireless interface.

9. The image processing apparatus according to claim 1, wherein the another mode is a static image mode.

10. The image processing apparatus according to claim 1, wherein the image capturing part comprises a lens.

11. An image processing method comprising:
capturing light through a lens unit of an image processing apparatus;
controlling display on a first display, disposed on a same side of the image processing apparatus as the lens unit, and on a second display, disposed on a side of the image processing apparatus other than the side on which the first display is disposed; and
setting a capturing mode of the image processing apparatus to one of a plurality of modes including at least a moving subject mode and another capturing mode,
wherein when the capturing mode is set to the moving subject mode, controlling display comprises controlling the second display to display one or more monitoring images, and controlling the first display to not display the one or more monitoring images, and
said method further comprising controlling the first display to display text data thereon.

12. An image processing system comprising:
an image capturing part to capture light through a lens unit of an image processing apparatus;
a first display disposed on a same side of the image processing apparatus as the lens unit;
a display control part to control display on the first display and on a second display, the second display being disposed on a side of the image processing apparatus other than the side on which the first display is disposed; and
an operation part for setting a capturing mode of the image processing apparatus to one of a plurality of modes including at least a moving subject mode and another capturing mode,
wherein the display control part controls the second display to display one or more monitoring images, and controls the first display to not display the one or more monitoring images, in a case that the capturing mode is set to the moving subject mode, and wherein the display control part is operable to control the first display to display text data thereon.

13. An image processing device comprising:
a circuitry configured to
control a display on a first display and on a second display, the first display begin disposed on a same side of a image processing apparatus as a lens unit which is configured to through a light to an image capturing part, and a second display being disposed on a side of the image processing apparatus other than the side on which the first display is disposed; and
set a capturing mode of the image processing apparatus to one of a plurality of modes including at least a moving subject mode and another capturing mode,
wherein the circuitry is configured to control the second display to display one or more monitoring images, and control the first display to not display the one or more monitoring images, in a case that the capturing mode is set to the moving subject mode, and
control the first display to display text data thereon.

* * * * *